(12) United States Patent
Deck

(10) Patent No.: US 10,845,251 B2
(45) Date of Patent: Nov. 24, 2020

(54) WAVEMETER USING PAIRS OF INTERFEROMETRIC OPTICAL CAVITIES

(71) Applicant: Zygo Corporation, Middlefield, CT (US)

(72) Inventor: Leslie L. Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 16/449,770

(22) Filed: Jun. 24, 2019

(65) Prior Publication Data

US 2020/0003620 A1 Jan. 2, 2020

Related U.S. Application Data

(60) Provisional application No. 62/691,087, filed on Jun. 28, 2018.

(51) Int. Cl.
*G01J 9/02* (2006.01)
*G01J 3/453* (2006.01)
*G01J 3/26* (2006.01)

(52) U.S. Cl.
CPC .............. *G01J 9/0246* (2013.01); *G01J 3/26* (2013.01); *G01J 3/453* (2013.01); *G01J 2003/4538* (2013.01); *G01J 2009/0226* (2013.01)

(58) Field of Classification Search
None
See application file for complete search history.

(56) References Cited

U.S. PATENT DOCUMENTS 4,172,663 A * 10/1979 Byer .................. G01J 9/02
356/454
6,795,188 B2 9/2004 Ruck et al.
(Continued)

FOREIGN PATENT DOCUMENTS

| JP | 2004-205271 | 7/2004 | ................ G01J 3/18 |
| TW | I439661 | 6/2014 | ............ G01B 11/24 |
| TW | I489083 | 6/2015 | ............ G01B 11/24 |

OTHER PUBLICATIONS

"High Finesse Laser and Electronic Systems", *Angsrom Wavemeter*, Web brochure (Downloaded in 2018).
(Continued)

*Primary Examiner* — Michael P LaPage
(74) *Attorney, Agent, or Firm* — Fish & Richardson P.C.

(57) ABSTRACT

Method and apparatus for determining the wavelength of a light beam are provided. An input light beam is received, and light from the input light beam is distributed to multiple channels. At a first pair of interferometer cavities that has a first free spectral range, two of the multiple channels of light are received. The intensity of light reflected from the first pair of cavities is measured, and a first estimate of the wavelength or optical frequency of the input light beam is determined based on measurements of interference signals from the first pair of cavities and an initial estimate of the wavelength or optical frequency. At a second pair of cavities that has a second free spectral range smaller than the first free spectral range, another two of the multiple channels of light are received. The intensity of light from the second pair of cavities is measured, and a second estimate of the wavelength or optical frequency of the input light beam is determined based on the first estimate and measurements of
(Continued)

interference signals from the second pair of cavities, in which the second estimate is more accurate than the first estimate.

21 Claims, 11 Drawing Sheets

(56) References Cited

U.S. PATENT DOCUMENTS

| | | | |
|---|---|---|---|
| 7,940,819 B2 | 5/2011 | Takabayashi et al. | |
| 9,030,670 B2 | 5/2015 | Warden et al. | |
| 9,438,005 B1 | 9/2016 | Zhao et al. | |
| 9,766,131 B2 | 9/2017 | Seeley et al. | |
| 10,190,871 B2 | 1/2019 | Deck | |
| 2003/0035120 A1* | 2/2003 | Myatt | G01J 9/0246 |
| | | | 356/519 |
| 2004/0012791 A1 | 1/2004 | Colonna de Lega et al. | |
| 2005/0018995 A1* | 1/2005 | Chang | H04B 10/572 |
| | | | 385/147 |
| 2006/0215167 A1* | 9/2006 | O'Gorman | G01J 9/0246 |
| | | | 356/454 |
| 2009/0021723 A1 | 1/2009 | De Lega | |
| 2010/0091296 A1 | 4/2010 | de Groot et al. | |
| 2014/0098375 A1 | 4/2014 | Liesener et al. | |
| 2015/0002852 A1 | 1/2015 | de Groot et al. | |
| 2017/0356739 A1 | 12/2017 | Deck | |
| 2019/0293491 A1* | 9/2019 | Georges Des Aulnois | |
| | | | G01J 9/0246 |

OTHER PUBLICATIONS

The Taiwan Office Action for Taiwan Application No. TW 108122272 dated Jul. 2, 2020 (with English Translation).

The International Search Report and Written Opinion of the International Searching Authority for International Application No. PCT/US2019/039008 dated Oct. 11, 2019.

* cited by examiner

WAVEMETER USING PAIRS OF INTERFEROMETRIC OPTICAL CAVITIES

CROSS-REFERENCE TO RELATED APPLICATION

This application claims priority to U.S. provisional patent application 62/691,087, filed on Jun. 28, 2018, the entire contents of which are incorporated by reference.

BACKGROUND

This description relates to wavemeters that can accurately measure the wavelengths of light beams.

For high performance Fourier Domain Optical Coherence Tomography (FD-OCT) or swept wavelength distance measuring applications, it is important to know the wavelength (or equivalently the wavenumber or optical frequency) of the illumination at each point in the wavelength scan—also called an A-scan (axial-scan). In some examples, the swept wavelength engine is designed to produce linear sweeps (sweeps with equally spaced wavenumber steps) to enable efficient use of Fourier analysis methods. In some examples, some wavelength jitter occurs during the sweep, which reduces vertical resolution when analyzing the axial-scan for depth information. In modern optical coherence tomography applications, the axial-scan frequency can exceed a million axial-scans per second, requiring the interference signal in each axial-scan to be sampled at GHz rates or higher. It is therefore important to be able to measure the absolute wavelength at similar rates—either to aid in linearizing the scan, or to post-correct an optical coherence tomography or distance measuring analysis for wavenumber nonlinearities that occurred during the scan.

SUMMARY

In one general aspect, a method for determining the wavelength or optical frequency of a light beam is provided. The method includes receiving an input light beam, and distributing light from the input light beam to multiple channels. The method includes receiving, at a first pair of interferometer cavities, two of the multiple channels of light, in which the first pair of cavities has a first free spectral range. The method includes measuring intensity of light reflected from the first pair of cavities, and determining a first estimate of the wavelength or optical frequency of the input light beam based on measurements of interference signals from the first pair of cavities and an initial estimate of the wavelength or optical frequency of the input light beam. The method includes receiving, at a second pair of cavities, another two of the multiple channels of light, in which the second pair of cavities has a second free spectral range smaller than the first free spectral range. The method includes measuring intensity of light from the second pair of cavities, and determining a second estimate of the wavelength or optical frequency of the input light beam based on the first estimate and measurements of interference signals from the second pair of cavities, in which the second estimate is more accurate than the first estimate.

Implementations of the invention may include one or more of the following features. The intensity of light reflected from the first pair of cavities and the intensity of light from the second pair of cavities can be measured concurrently. The first pair of cavities can be in approximate quadrature. The input light beam can have a wavelength that is approximately known to be within a range between a first wavelength $\lambda 1$ and a second wavelength $\lambda 2$, the first pair of cavities can include a first interferometer cavity and a second interferometer cavity, the first interferometer cavity can have a first cavity gap length $g1$, and the second interferometer cavity can have a second cavity gap length $g2$. An absolute difference $|g1-g2|$ between the first cavity gap length and the second cavity gap length can be approximately $m1 \cdot \lambda_0/8$, in which $\lambda_0 = (\lambda 1 + \lambda 2)/2$, and $m1$ is an odd integer. In some examples, $0.5 \cdot m1 \cdot \lambda_0/8 < |g1-g2| < 1.5 \cdot m1 \cdot \lambda_0/8$. In some examples $0.8 \cdot m1 \cdot \lambda_0/8 < |g1-g2| < 1.2 \cdot m1 \cdot \lambda_0/8$. In some examples, $0.9 \cdot m1 \cdot \lambda_0/8 < |g1-g2| < 1.1 \cdot m1 \cdot \lambda_0/8$. In some examples, $0.99 \cdot m1 \cdot \lambda_0/8 < |g1-g2| < 1.01 \cdot m1 \cdot \lambda_0/8$.

In another general aspect, a wavemeter for determining the wavelength or optical frequency of a light beam is provided. The wavemeter includes an optical distributor configured to receive an input light beam and distribute light from the input light beam to multiple channels. The wavemeter includes a first module defining a first pair of cavities configured to receive two channels of light from the optical distributor, in which the first pair of cavities has a first free spectral range, and a second module defining a second pair of cavities configured to receive another two channels of light from the optical distributor, in which the second pair of cavities has a second free spectral range that is smaller than the first free spectral range. The wavemeter includes a processor configured to determine a first estimate of the wavelength or optical frequency of the input light beam based on measurements of interference signals from the first pair of cavities and an initial estimate of the wavelength or optical frequency, and determine a second estimate of the wavelength or optical frequency of the input light beam based on measurements of interference signals from the second pair of cavities and the first estimate of the wavelength or optical frequency, in which the second estimate is more accurate than the first estimate.

In another general aspect, a wavemeter for determining the wavelength or optical frequency of a light beam is provided. The wavemeter includes an optical distributor configured to receive an input light beam and distribute light from the input light beam to multiple channels. The wavemeter includes a plurality of modules, in which each module defines a set of cavities, each set of cavities includes at least two cavities, and each cavity is configured to receive a channel of light from the optical distributor. The wavemeter includes a processor configured to estimate the wavelength or optical frequency of the input light beam based on measurements of interference signals from the sets of cavities and an initial estimate of the wavelength or optical frequency. A first estimate is determined based on measurements from a first set of cavities having a largest free spectral range, the first estimate is refined using measurements from one or more additional sets of cavities having a smaller free spectral range or smaller free spectral ranges than that of the first set of cavities, and a final estimate is determined using an earlier estimate and measurements from a final set of cavities having a smallest free spectral range among the sets of cavities.

In another general aspect, a method for determining the wavelength or optical frequency of a light beam is provided. The method includes receiving an input light beam; distributing light from the input light beam to multiple channels; receiving, at a pair of interferometer cavities, two of the multiple channels of light; measuring intensity of light reflected from the pair of cavities; and determining a refined estimate of the wavelength or optical frequency of the input light beam based on measurements of interference signals from the pair of cavities and an initial estimate of the wavelength or optical frequency of the input light beam.

In another general aspect, a wavemeter for determining the wavelength or optical frequency of a light beam is provided. The wavemeter includes an optical distributor configured to receive an input light beam and distribute light from the input light beam to multiple channels; a set of cavities comprising at least two cavities, each cavity configured to receive a channel of light from the optical distributor; and a processor configured to estimate the wavelength or optical frequency of the input light beam based on measurements of interference signals from the set of cavities and an initial estimate of the wavelength or optical frequency, in which a refined estimate is determined based on measurements from the set of cavities.

In another general aspect, an optical coherence tomography system is provided in which the OCT system uses the wavelength information provided by the wavemeter or the wavelength determination method described above.

The various aspects can be implemented as methods, apparatuses, systems, computer-readable media, means for performing the methods, or a combination of the above.

Unless otherwise defined, all technical and scientific terms used herein have the same meaning as commonly understood by one of ordinary skill in the art to which this invention belongs. In case of conflict with patent applications incorporated herein by reference, the present specification, including definitions, will control.

Other features, objects, and advantages of the invention will be apparent from the following detailed description.

BRIEF DESCRIPTION OF DRAWINGS

Like reference symbols in the various drawings indicate like elements.

DETAILED DESCRIPTION

This document describes a wavemeter that enables the measurement of the wavelength of laser light at a high speed. The wavemeter is useful for rapidly measuring the wavelengths of a swept wavelength tunable laser at different points in the sweep. In some implementations, the wavemeter includes two or more sets of interferometer cavities with different free spectral ranges, in which each set of interferometer cavities includes two or more interferometer cavities with a similar free spectral range, with at least one pair of interferometer cavities in approximate quadrature at a particular wavelength. A first set of cavities allows the determination of a first estimate of the wavelength of the laser light to within one-half of a first free spectral range of the first set of cavities of an initial estimate of the wavelength using a mathematical model of the first set of cavities. A second set of cavities having a second free spectral range smaller than that of the first set of cavities allows the determination of a second estimate of the wavelength of the laser light to within one-half of the second free spectral range of the first estimate of the wavelength using a mathematical model of the second set of cavities. In a similar manner, by using an additional set or sets of interferometer cavities having smaller free spectral range or ranges than that of the previous set, more accurate estimate or estimates of the wavelength of the laser light can be determined. This way of using more than one set of interferometer cavities to determine the light wavelength is referred to as a "cascaded analysis method" for determining the light wavelength.

Figure 1:
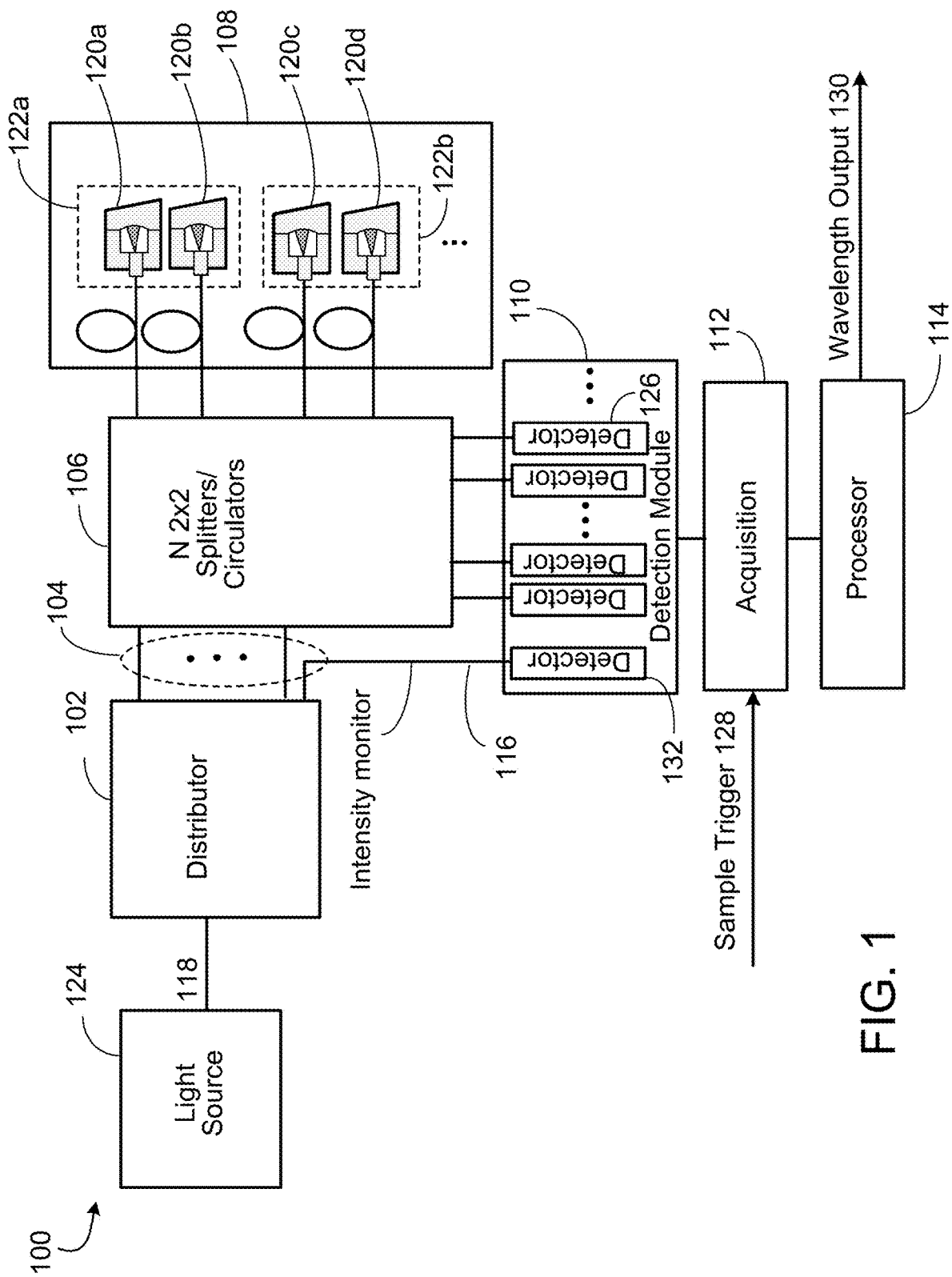
FIG. 1 is a block diagram of an example wavemeter system architecture having N interferometer cavities.

Referring to FIG. 1, in some embodiments, a wavemeter 100 (also referred to as an optical frequency monitor (OFM)) includes an optical distributor 102 that receives an input light beam 118 provided by a light source 124. The light source 124 can be a swept wavelength tunable laser. The optical distributor 102 splits and directs laser light into a number of channels 104. For example, the optical distributor 102 can be a fiber distributor that distributes light received from the light source 124 into multiple channels of light that propagate in multiple optical fibers. For example, the optical distributor 102 can include free space optics that divide a laser beam into multiple channels of laser beams that propagate in air.

A splitter/circulator module 106 directs light in some of the channels 104 to an interferometer cavity module 108 that includes a plurality of sets of interferometer cavities, e.g., 122a and 112b, collectively referenced as 122. Each set of interferometer cavities 122 includes two or more interferometer cavities, e.g., 120a and 120b in one set, 120c and 120d in another set, collectively referenced as 120.

Figure 2:
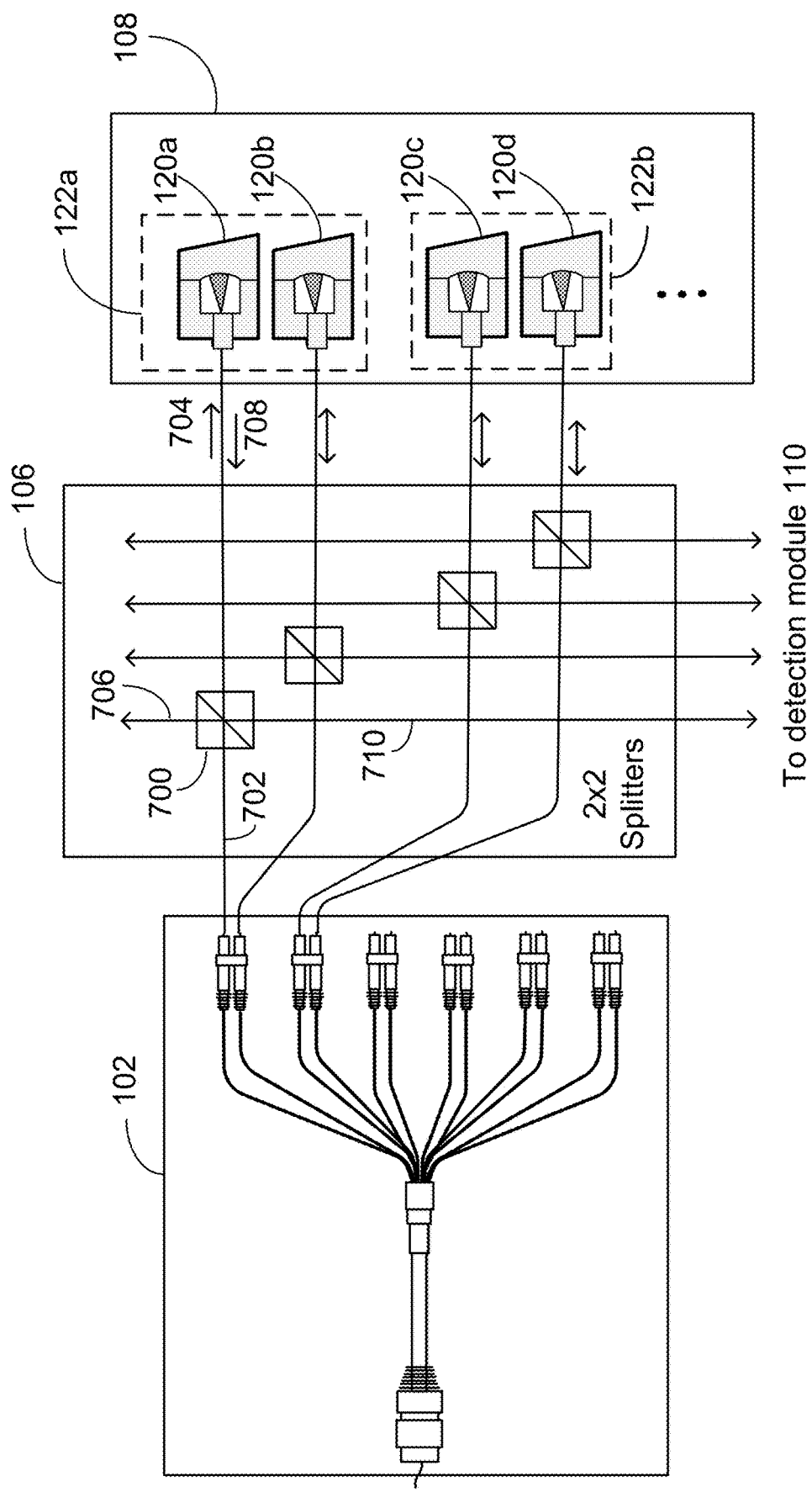
FIG. 2 is a block diagram of a portion of an example wavemeter system that uses optical splitters.

Referring to FIG. 2, the splitter/circulator module 106 can include optical splitters 700, such as beamsplitter cubes. For example, a beamsplitter 700 has two input ports and two output ports. The beamsplitter 700 receives the input light beam at a first input port, splits the input light beam into two output beams 704 and 706 that are directed to a first output port and a second output port, respectively. The output beam 704 is directed to the corresponding cavity 120, whereas the output beam 706 is not used. The return light 708 that comes back from the cavity 120 is received at the first output port and directed by the beamsplitter 700 to a second input port. The light that comes out of the second input port propagates towards the corresponding detector 126.

Figure 3:
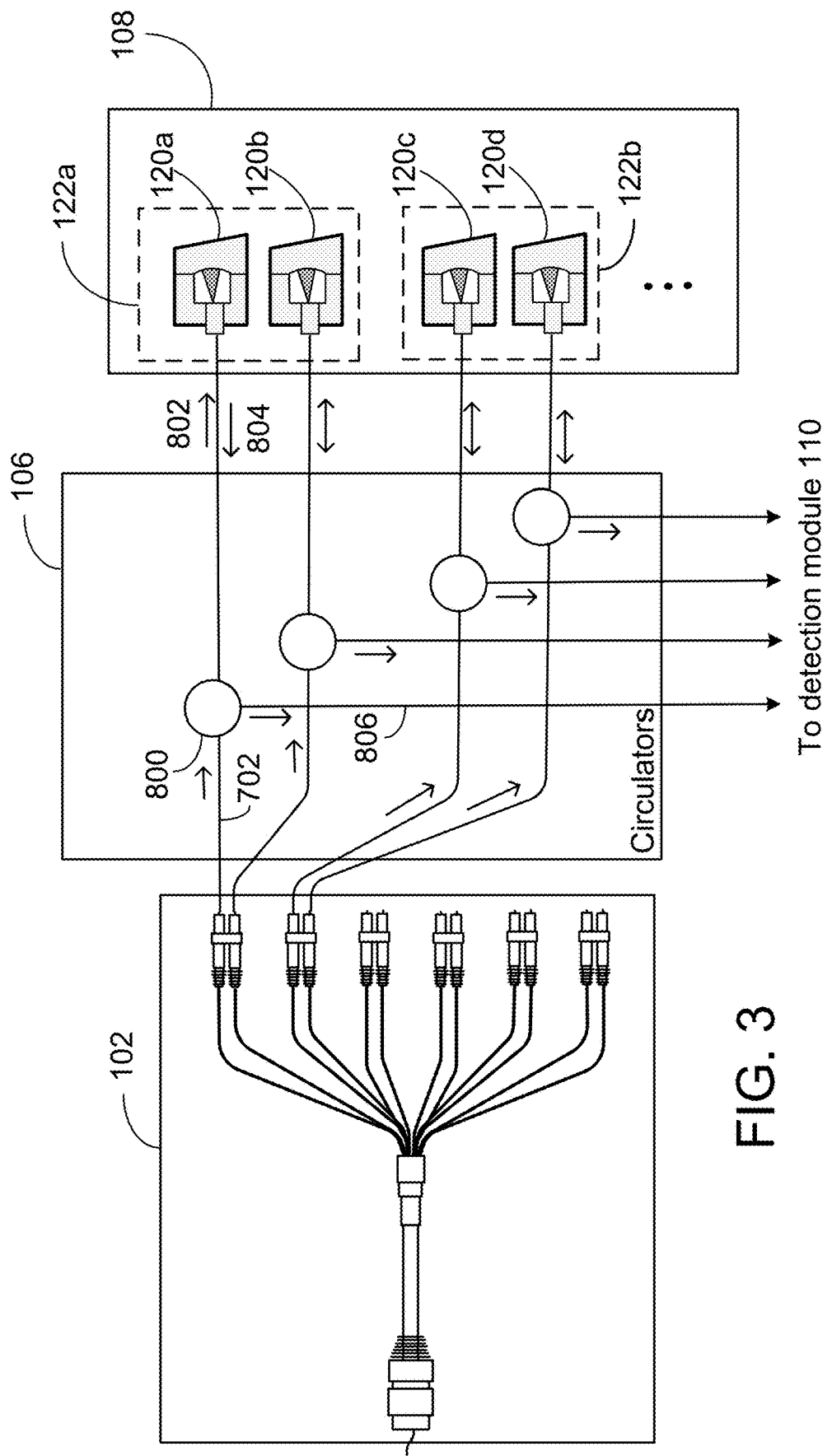
FIG. 3 is a block diagram of a portion of an example wavemeter system that uses optical circulators.

Referring to FIG. 3, the splitter/circulator module 106 can include optical circulators 800. For example, a circulator 800 has three ports. The circulator 800 receives the input light 702 at a first port, and directs the input light to a second port. The output beam 802 from the second port is directed to the corresponding cavity 120. The return light 804 that comes back from the cavity 120 is directed into the second port, and the circulator 800 forwards the return light 804 to a third port. The output beam 806 from the third port propagates towards the corresponding detector 126.

In the example of FIG. 1, the set of interferometer cavities 122a includes two interferometer cavities 120a and 120b, and the set of interferometer cavities 122b includes two interferometer cavities 120*c* and 120*d*. However, in other examples, a set of interferometer cavities can include three or more interferometer cavities.

The light in each channel is directed toward a cavity 120, and interfering light is reflected by the cavity 120 back towards the splitter/circulator module 106. The splitter/circulator module 106 captures the reflected interfering light from the sets of cavities 122, and directs the reflected light to a detection module 110 that includes a plurality of detectors 126. For example, each detector 126 can be a photodiode that is sensitive to light provided by the light source 124. Each detector 126 detects the intensity of light from one channel of light. An acquisition module 112 is provided to sample the light intensity from the channels of light provided by the detection module 110 at a high frequency rate. The sampling of data by the acquisition module 112 is triggered by a sample trigger signal 128.

For example, the acquisition module 112 can include a plurality of high speed analog-to-digital converters, in which each analog-to-digital converter samples the measurement signal provided by a corresponding detector 126. Each analog-to-digital converter can have, e.g., 8-bit, 10-bit, 12-bit, or 14-bit accuracy. Each analog-to-digital converter can have a sampling rate of, e.g., up to 1 KHz, up to 10 KHz, up to 100 KHz, up to 1 MHz, up to 10 MHz, up to 100 MHz, up to 1 GHz, or up to 10 GHz or more. A data processor 114 processes the data from the acquisition module 112 to determine the wavelength of the light at a high speed, and generates a wavelength output 130.

For example, the light source 124 can be a swept wavelength tunable laser that sweeps the wavelength or frequency at a fast rate, e.g., several thousands, or several tens of thousands, or several hundreds of thousands of sweeps per second. There can be tens, hundreds, or several thousands of points per sweep. During each sweep, the laser successively changes from one mode to the next and stays on one mode for, e.g., about 1 ms, about 100 nm, about 10 ns, or about 1 ns. For example, suppose the laser 124 performs 400,000 sweeps per second at 1,000 points per sweep, or 200,000 sweeps per second at 2,000 points per sweep. The acquisition module 112 is configured to sample the measurements within 2.5 ns, and the processor 114 is configured to calculate the wavelengths from the sampled data within 2.5 ns. This allows the processor 114 to provide 400,000,000 accurate wavelength data per second.

In some implementations, the acquisition module 112 stores the sampled measurements in a data storage, and the processor 114 processes the stored sample data to calculate the wavelengths at a later time. The processor 114 can calculate the wavelengths either concurrently or non-concurrently with the sampling of the measurement signals. Thus, the processor 114 can calculate the wavelengths either concurrently or non-concurrently with the scanning or sweeping operations of the swept wavelength tunable laser. The wavelength information can be used to aid in linearizing the scan, or to post-correct an optical coherence tomography or distance measuring analysis for wavenumber nonlinearities that occurred during the scan.

In some implementations, at least one channel of the laser light (e.g., 116) is used for monitoring the intensity of the laser light 118 to account for intensity variations of the light source 124. The intensity of the channels of light that are reflected by the cavities 120 and measured by the detection module 110 can be normalized using the intensity of the channel of light 116 that is monitored. As described in more detail below, the wavemeter 100 can have a mechanism for blocking the light to a second surface of some or all of the cavities 120 in order to determine wavelength dependent losses during calibration.

A process 600 for accurately determining the wavelength of laser light at a high speed is described in more detail below. The process 600 includes using normalized intensity signals from at least two cavities in a set to obtain a refined measure of the light wavelength to within one-half of a free spectral range of the initial estimate using a mathematical model of the cavities. A calibration procedure for obtaining characteristics of the cavities needed by the model and/or normalization is described in more detail below. The light wavelength information can be provided to a user at a high frequency rate.

The wavemeter 100 is designed to provide absolute wavelength measurements at very high rates over a specified range of wavelengths. Consider a light source that outputs a light beam having wavelengths anywhere within a spectral bandwidth of $\Delta\lambda$ about a central wavelength of $\lambda_0$. The wavemeter 100 measures the wavelength at a high speed with a precision of $\delta\lambda<<\Delta\lambda$. In the example shown in FIG. 1, the interferometer cavity module 108 includes N interferometer cavities 120. The N interferometer cavities 120 are divided into a plurality of sets of interferometer cavities 122, in which each set of interferometer cavities 122 includes two or more interferometer cavities 120.

In the description below, each set of interferometer cavities 122 includes a pair of interferometer cavities 120 that have approximately the same free spectral range, and the pair of interferometer cavities are in approximate quadrature near the center wavelength. Thus, for N cavities, there can be N/2 pairs of cavities. It is also possible to configure the cavities 120 such that a set 122 includes three or more interferometer cavities 120 that have approximately the same free spectral range, and at least one pair of interferometer cavities 120 are in approximate quadrature near the center wavelength.

The wavemeter concept is based on simultaneous intensity measurements from a pair of interferometer cavities 120 having almost the same optical path length (OPL). The difference in the optical path lengths of the pair (the optical path difference (OPD)) is equal to m $\lambda_0/4$, in which m is an odd integer. Thus, the interferometric phase difference between the cavity pairs is ~m $\pi/2$ over a broad range of wavelengths about $\lambda_0$ and the pair of cavities 120 is said to be in quadrature and referred to as a quad-pair (QP) 122. When normalized quadrature signals of the pairs of cavities 122 are parameterized by wavelength and plotted against each other, the plot generally describes an elliptical Lissajous figure, with the degree of ellipticity contingent on the OPD of the pair. A circle for example denotes a perfect 90° phase difference relationship.

Since low Finesse cavities are assumed, the signals from each cavity are well described by pure cosine interference $I_{meas}=A+B \cos \theta$, where $I_{meas}$ is the measure intensity, A and B are the DC and AC terms respectively and $\theta$ describes the interference phase. The "normalized signals" mentioned above are produced by subtracting the DC term from the measured intensity and dividing by the AC term $I_{norm}=(I_{meas}-A)/B$. The normalized signal are sometimes referred to as the "cosine equivalent" signals.

Figure 4B:
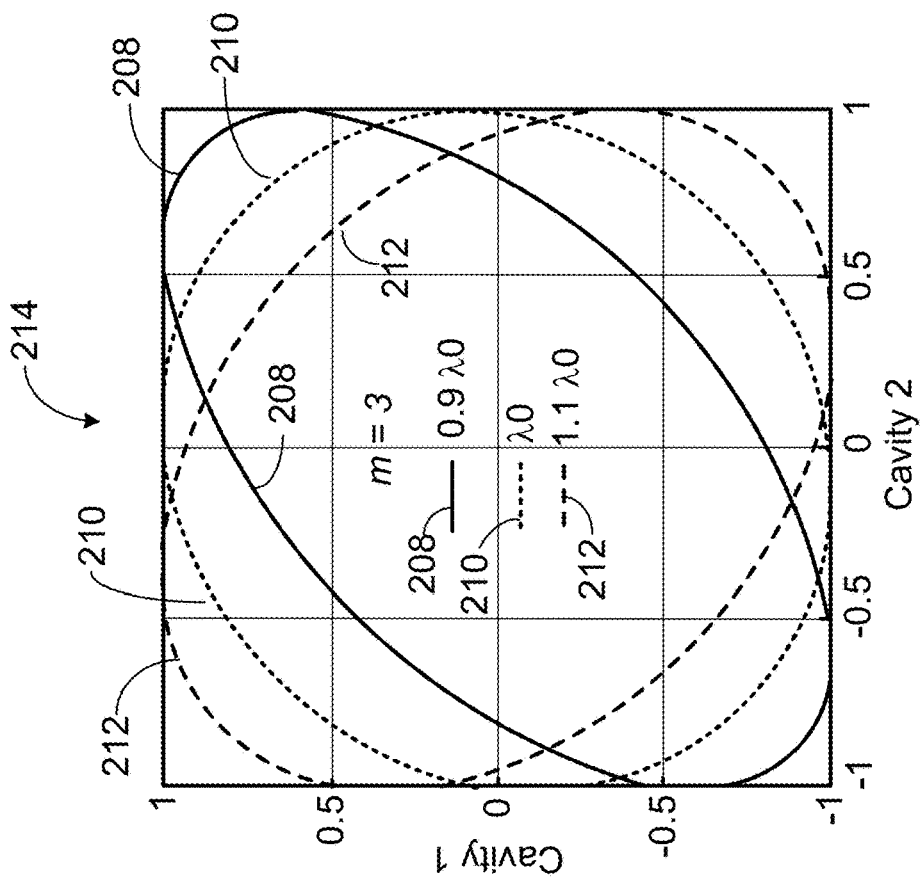
FIGS. 4A and 4B are example Lissajous figures corresponding to three wavelengths from a quadrature pair designed to be in quadrature at $\lambda_0$ for m=1 and m=3, respectively.
Figure 4A:
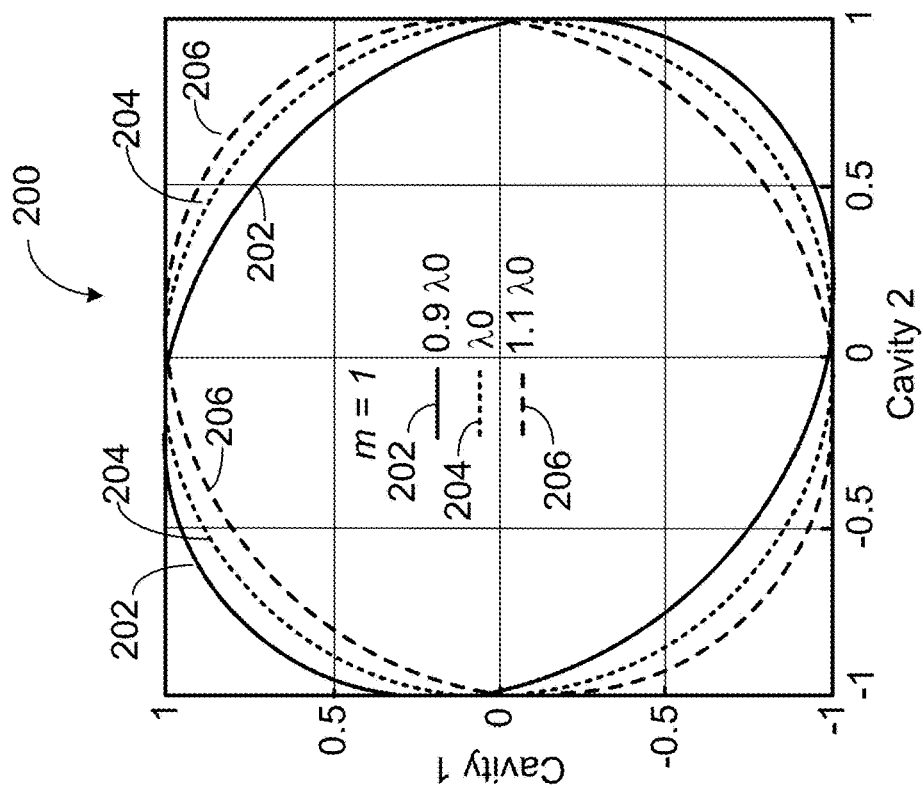

FIG. 4A is a graph 200 that shows a Lissajous figure obtained by plotting the normalized intensity signals from a quad-pair produced from two low-finesse cavities 120 with the optical path difference set to $\lambda_0/4$ for a range of wavelengths about $0.94\lambda_0$, $\lambda_0$ and $1.1\lambda_0$. The vertical axis represents the normalized light intensity from the first cavity, and the horizontal axis represents the normalized light intensity from the second cavity. Each ellipse represents wavelength points spanning one free spectral range (FSR) of the cavity 120, $$FSR = c/OPL = c/2G \quad \text{(Equ. 1)}$$

in which c is the speed of light 299,792,458 m/s, G is the cavity gap length, and the optical path length is twice the cavity gap length. When we say that two cavities have approximately the same free spectral range, we mean that the two cavities have gap lengths that are approximately the same, such that the ratio of the difference in the gap lengths to the average gap length is less than 10%. For example, if the first cavity has a gap length of g1, the second cavity has a gap length of g2, then the two cavities have approximately the same free spectral range when $|(g1-g2)/((g1+g2)/2)| < 10\%$. The free spectral range of a pair of cavities refers to $c/(2G)$, in which $G = (g1+g2)/2$, g1 is the gap length of the first cavity and g2 is the gap length of the second cavity.

In FIG. 4A, an ellipse 202 represents wavelength points spanning one free spectral range of the cavity 120, in which the wavelength varies from $0.9\lambda_0-FSR/2$ to $0.9\lambda_0+FSR/2$. A circle 204 represents wavelength points spanning one free spectral range of the cavity 120, in which the wavelength varies from $\lambda_0-FSR/2$ to $\lambda_0+FSR/2$. An ellipse 206 represents wavelength points spanning one free spectral range of the cavity, in which the wavelength varies from $1.1\lambda_0-FSR/2$ to $1.1\lambda_0+FSR/2$.

FIG. 4B is a graph 214 that shows a Lissajous figure obtained by plotting the normalized intensity signals from a quad-pair produced from two low-finesse cavities 120 with the optical path difference set to $3*\lambda_0/4$ for a range of wavelengths about $0.9\lambda_0$, $\lambda_0$ and $1.1\lambda_0$. An ellipse 208 represents wavelength points spanning one free spectral range of the cavity, in which the wavelength varies from $0.92\lambda_0-FSR/2$ to $0.92+FSR/2$. An ellipse 210 represents wavelength points spanning one free spectral range of the cavity, in which the wavelength varies from $\lambda_0-FSR/2$ to $\lambda_0+FSR/2$. An ellipse 212 represents wavelength points spanning one free spectral range of the cavity, in which the wavelength varies from $1.1\lambda_0-FSR/2$ to $1.1\lambda_0+FSR/2$.

FIGS. 4A and 4B indicate that within a wavelength range of ±F, in which $$\Gamma = \frac{FSR}{2} = \frac{c}{4G}, \quad \text{(Equ. 2)}$$

a point on the curve 202, 204, 206, 208, 210, or 212, and hence the wavelength at that point, is uniquely identified by just two light intensity values. This is true for small values for m over a rather large wavelength range $\Delta\lambda$ (e.g., in this case as large as 20% of $\lambda_0$, from 0.90 to 1.10).

Figure 5:
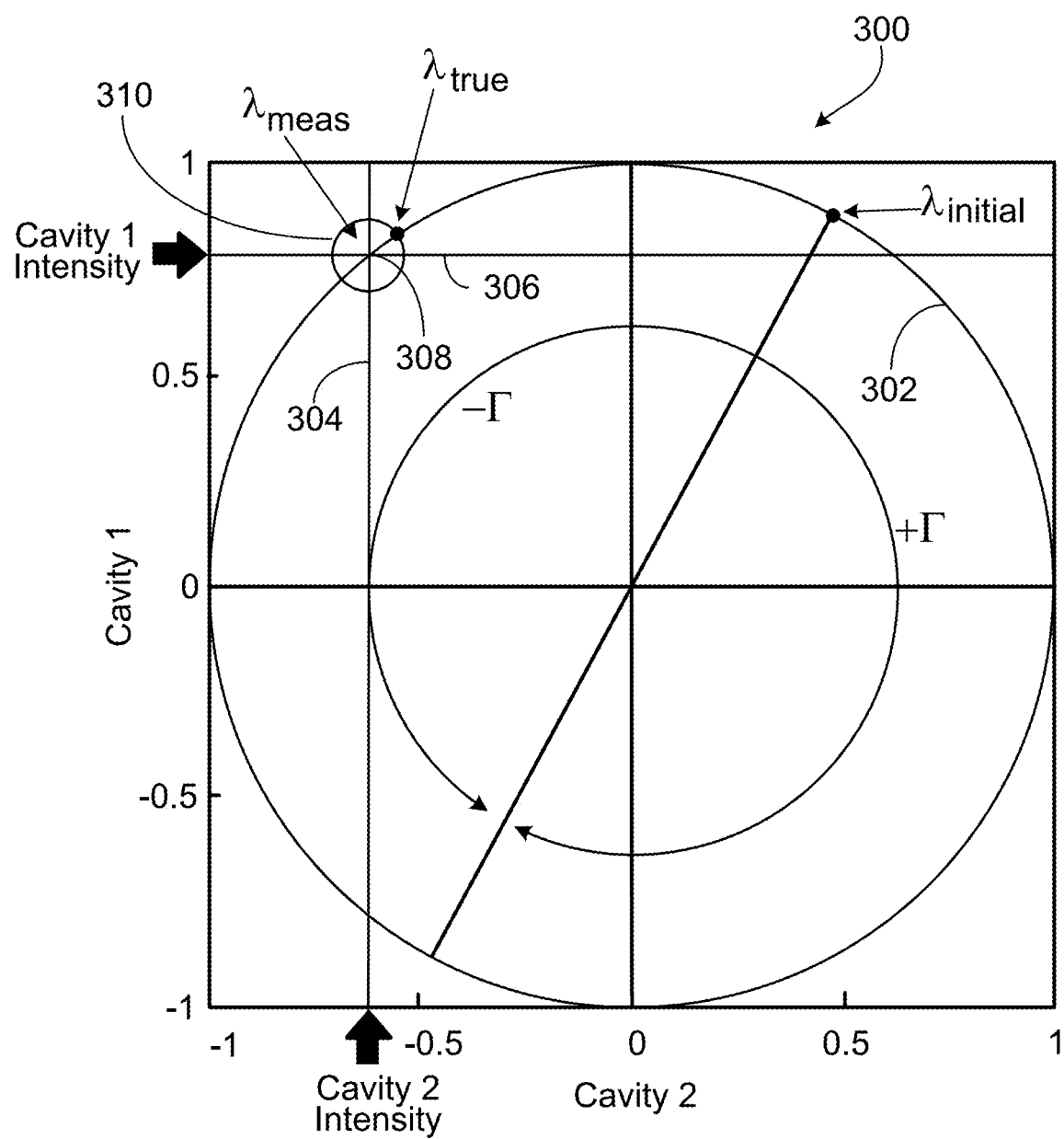
FIG. 5 is a diagram showing an example of how the uncertainty of the wavelength is reduced.

Referring to FIG. 5, a diagram 300 shows a Lissajous figure that includes a circle 302 obtained by plotting the normalized intensity signals from a quad-pair 122 produced from two low-finesse cavities 120 with the optical path difference set to $\lambda_0/4$ for a range of wavelengths about $\lambda_0$. Assume that light with true wavelength $\lambda_{true}$ is directed into the quad-pair 122, and the wavelength is initially known to be $\lambda_{initial}$ with an uncertainty less than half the free spectral range. The two normalized (removing the DC term and dividing by the AC term) measured intensities from the quad-pair 122, shown as lines 304 and 306, intersect at a point 308 within $\Gamma$ of $\lambda_{initial}$, in which the point 308 defines the measured wavelength $\lambda_{meas}$. The circle 310 about $\lambda_{meas}$ represents the error in this measurement. The wavelength uncertainty is thus reduced by a factor equal to the arc length within the circle 302 divided by the free spectral range.

The Lissajous figures shown in FIGS. 4A, 4B, and 5 are formed using idealized normalized cavity intensities (pure cosine interference). In practice, the curves can be distorted due to physical, environmental, and/or fabrication effects, which introduce additional intensity errors if not corrected for. If the distortions are known either from first principles or through calibrations, the wavelength uncertainty can still be reduced using the wavemeter concept.

Assuming the measurements are not shot-noise limited, geometric arguments using FIG. 5 imply that the final root-mean-square (rms) optical frequency measurement uncertainty, U, for a cavity pair with gap G is given by:

$$U = \frac{\sqrt{2}}{\pi} \frac{c}{2G} / SDR \quad \text{(Equ. 3)}$$

in which SDR is the root-mean-square dynamic range of the intensity measurements for both cavities 120 in the quad-pair 122.

Increasing the quad-pair 122 free spectral range increases the allowable initial wavelength range but also the final wavelength uncertainty. For example, an application may require a large free spectral range and a final wavelength uncertainty lower than what can be achieved using one quad-pair 122. In this case, a sequence of quad-pairs 122 of descending free spectral ranges can be analyzed to provide both a large free spectral range and a low wavelength uncertainty using a cascaded analysis.

In a cascaded analysis, a number of quad-pairs 122 having descending free spectral ranges are analyzed in series with the initial estimated wavelength for a quad-pair 122 coming from the measured wavelength (wavelength determined based on light intensity measurements) from a previous, larger free spectral range quad pair 122. The first quad-pair 122 in the series is set to accommodate the initial wavelength uncertainty while the last quad-pair 122 in the series defines the final wavelength uncertainty.

In some implementations, the wavemeter 100 incorporates a number of pairs of known, stable, low finesse, optical cavities 120 of different cavity gap lengths. The difference in the cavity gap lengths of the two cavities 120 forming a quad-pair 122 is m·⅛ of the mean wavelength in the specified wavelength range, m being an odd integer, producing an approximate quadrature interferometric phase difference between the two cavities 120 of the quad-pair 122 over the specified wavelength range. Different quad-pairs 122 have different cavity lengths designed to extend the free spectral range of the wavemeter 100 to cover the maximum uncertainty of the initial wavelength estimate.

In some examples, more than two cavities 120 with similar optical path differences can be used as long as they have unique optical path differences and at least two are in quadrature. For example, suppose there are n cavities $cavity_1$ to $cavity_n$, and $cavity_1$ and $cavity_2$ are in quadrature. Suppose $D_{ij}$ represents the path length difference between cavity i and cavity j. The cavity gaps of the n cavities are designed such that the path length difference $D_{12}$ is slightly different from $D_{13}$, $D_{12}$ is slightly different from $D_{14}$, . . . , $D_{12}$ is slightly different from $D_{1n}$, and so forth. By having similar but slightly different path length differences among the cavities, additional information can be obtained from the measurements of the intensities of light reflected from the interferometer cavities. Having more data points is useful when using regression to determine the optical frequency (described in more detail below).

Additionally, an intensity monitor, which can be, e.g., a detector 132 in the detection module 110, is used to account for illumination power variations at-speed (or in real time). This means that the detector 132 measures light from the channel 116 at the same time that the detectors 126 measure the reflected interfering light from the other channels. Thus, for N cavities (N/2 cavity pairs), the wavemeter 100 synchronously samples the intensity from N+1 channels at the sample rate. The total optical delay for all channels are matched for transform limited performance. A wavelength is independently computed from the set of N+1 intensity measurements at each time sample.

The wavemeter 100 requires a "starting estimate" for the wavelength at each time sample. The maximum uncertainty of this "starting estimate" depends on the wavemeter design (specifically the largest free spectral range), and can be smaller than the operable wavelength range. In some examples, the manufacturer of the laser light source 124 will specify the approximate wavelength of the light output from the laser light source 124. The approximate wavelength provided by the manufacturer can be used as the starting estimate for the cascaded analysis.

Equation 3 provides information about the approximate uncertainty in a wavelength measurement for a given free spectral range. The free spectral range is c/2G, so the ratio of the uncertainty in the wavelength measurement to the free spectral range is $\sqrt{2}/\pi$/SDR. To determine the approximate improvement in uncertainty using the pair of cavities, if 10-bit analog-to-digital converters are used, the SDR will be about 1000, so the uncertainty will be about 0.0005 of the free spectral range. This indicates that a quad-pair can improve the uncertainty by about 2000 times. If we assume that a quad-pair can improve the uncertainty by about 500 times, then two quad-pairs can reduce the uncertainty in the wavelength to $(1/500) \cdot (1/500) = 1/250{,}000$ of the initial uncertainty.

In some implementations in which two pairs of cavities are used, the free spectral range of the second pair of cavities can be less than 1/10 or 1/100 of the free spectral range of the first pair of cavities, and an uncertainty in the second estimate of the wavelength or optical frequency of the input light beam can be less than 1/10 or 1/100 of the uncertainty in the first estimate of the wavelength or optical frequency of the input light beam. In some implementations in which three pairs of cavities are used, the free spectral range of the third pair of cavities can be less than 1/10 or 1/100 of the free spectral range of the second pair of cavities, and an uncertainty in the third estimate of the wavelength or optical frequency of the input light beam can be less than 1/10 or 1/100 of the uncertainty in the second estimate of the wavelength or optical frequency of the input light beam. The uncertainty in the third estimate of the wavelength or optical frequency of the input light beam can be less than 1/100 or 10,000 of the uncertainty in the first estimate of the wavelength or optical frequency of the input light beam. Thus, the uncertainty in the third estimate of the wavelength or optical frequency of the input light beam can be less than 1/1,000 or 1,000,000 of the initial uncertainty.

Figure 7:
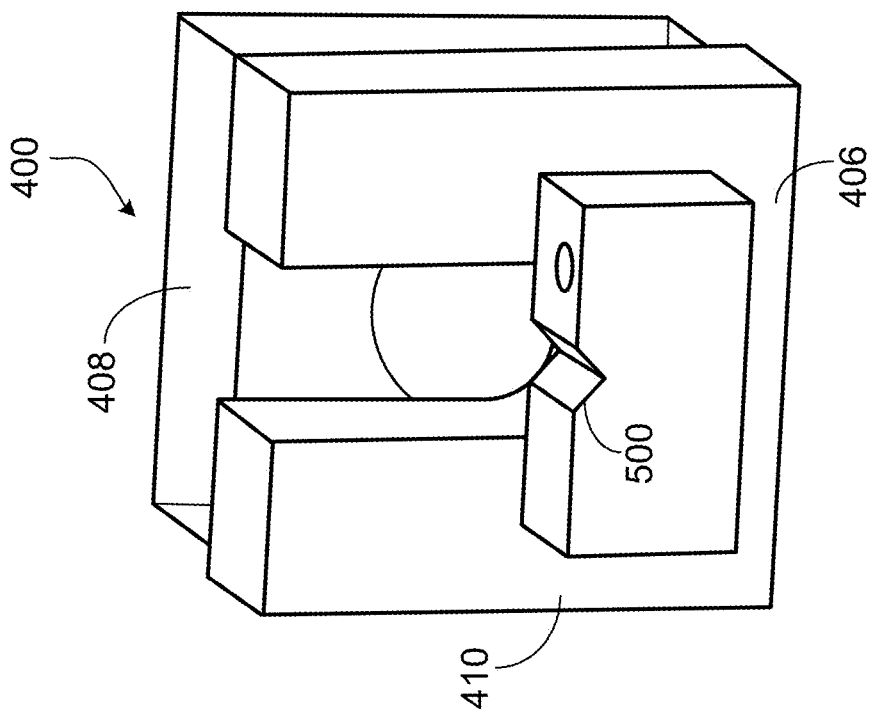
FIG. 7 is a perspective view of an example point diffraction interferometer cavity.
Figure 6:
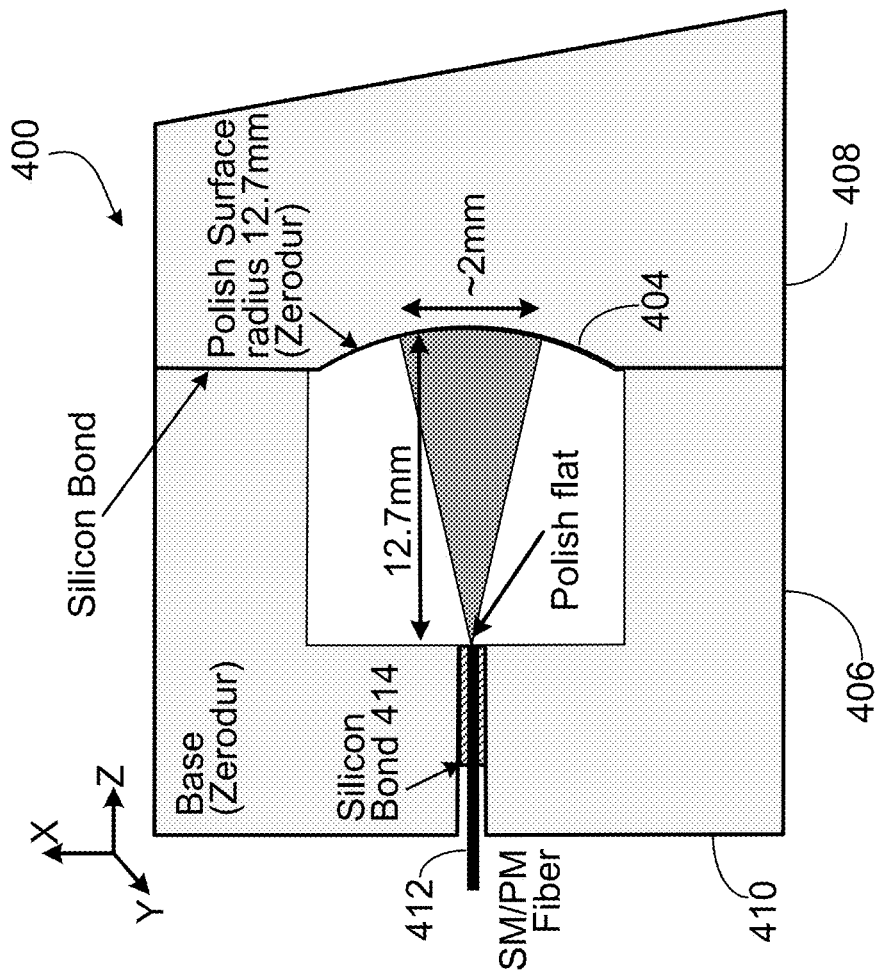
FIG. 6 is a diagram of an example point diffraction interferometer cavity design.

The cavities 120 can be any of a variety of types as long as they are stable and a sufficiently precise mathematical description of the interference is available. FIGS. 6 and 7 show an example cavity 400 that satisfies the criteria above. For example, the cavity design shown in FIGS. 6 and 7 can be used for the cavities 120 in FIG. 1. FIG. 6 shows a top view of the cavity 400, and FIG. 7 shows a perspective view of the cavity 400. In this example, the cavity 400 is a fiber based, point-diffraction cavity having two low reflectivity dielectric surfaces 402 and 404 that form a low finesse interferometer.

The cavity 400 can be defined by a structure 410 made of a material with a low thermal expansion coefficient, e.g., Zerodur®, so that the second surface 404 can be polished into the material itself, reducing cost and minimizing creep. For example, the structure 410 can include a base 406 and a wedge 408, in which the second surface 404 is a polished surface of the wedge 408. The base 406 can include a V-groove 500 (see FIG. 7) for supporting an optical fiber 412. For example, the optical fiber 412 can be a single mode polarization-maintaining (SM/PM) fiber. The optical fiber 412 can be secured to the V-groove 500 using a silicon bond 414.

The cavity 400 is small, stable, and achromatic over a wide range of wavelengths and is polarization insensitive. In this example, the cavity's first surface 402 is the fiber end face whose reflectivity is calculable from first principles. The second surface 404 is a spherical surface set normal to the expanding wavefront, producing a confocal cavity 400. Small adjustments to the cavity optical path difference to accommodate the quadrature requirement are performed by appropriately positioning the fiber along the V-groove 500. In some examples, it may be advantageous to enclose the cavities 400 to protect them from both atmospheric and temperature fluctuations. The term "cavity" depending on context may refer to the structure that defines the cavity space (which may contain gas or air), or refer to the cavity space itself (which may contain gas or air).

In the example of FIG. 6, the distance from the first surface 402 (fiber end face) to the second surface 404 (polished surface of the wedge 408) is about 12.7 mm, and the polished surface is a concave surface having a radius of curvature of 12.7 mm. The spread of the light after exiting the first surface 402 is about 2 mm. The dimensions of the cavity design shown in FIG. 6 are merely examples. The dimensions of the cavities 120 can be different for different applications.

For the dimensions of the cavity 400 shown in FIG. 6, the free spectral range of the cavity 400 is c/2G=299792458/ (2*0.0127)≅11.803 GHz. Suppose the manufacturer of the light source 124 specifies that the wavelength for a particular mode of the light beam 118 is approximately 900 nm. Such a wavelength is useful for optical coherence tomography applications. The 900 nm wavelength corresponds to a frequency of 333.103 THz. The cavity 400 allows a more accurate measurement of the light wavelength if the true frequency of the light beam is in a frequency range between 333.103 THz−11.803 GHz/2 to 333.103 THz+11.803 GHz/2, which corresponds to a wavelength range between 899.983 nm to 900.015 nm, in which Δλ=0.032 nm.

In order to achieve a free spectral range that is 1/10 of the free spectral range of the cavity 400 in FIG. 6, one can design an interferometer cavity having a cavity gap length that is 10 times the cavity gap length of the cavity 400, i.e., 12.7 cm. In this case, the free spectral range of the cavity 400 is c/2G≅1.1803 GHz. For a light beam 118 having a wavelength of approximately 900 nm, the cavity 400 allows a more accurate measurement of the light wavelength if the true frequency of the light beam is in a frequency range between 333.103 THz−1.1803 GHz/2 to 333.103 THz+ 1.1803 GHz/2, which corresponds to a wavelength range between 899.9977 nm to 900.00087 nm, in which Δλ=0.0032 nm.

Below is an example of a wavemeter having three quad-pairs. Assume that the wavemeter is used to measure the wavelength of nominally 1550 nm light having an input wavelength uncertainty range of ±50 nm (~12.5 THz) to achieve an output uncertainty of not more than 4 MHz (~0.03 µm). This system has a large measurement dynamic range of DR=~1,700,000:1.

For simplicity, assume the three cavity pairs have free spectral ranges that equalize their individual dynamic ranges ($DR_i$, i=1 to 3). The individual dynamic ranges satisfy DR=~1,700,000:1=$DR_i^3$, so $DR_i$=~120. To cover the initial wavelength uncertainty, the quad-pair having the largest free spectral range is designed such that an optical path length difference (OPL_diff1) between the reference and test beams satisfies $$\frac{c}{\text{OPL\_diff1}} \geq 12.5 \text{ THz},$$

which implies an optical path length difference between the reference and test beams of not more than 24 microns. For a double-pass interferometer, such as the cavity designs shown in FIGS. 6-11, this means that the gap length G is not more than 12 microns. For example, we can choose OPL_diff1 to be 24 microns, which corresponds to a gap length G=12 microns.

The intermediate quad-pair is designed to have a free spectral range that covers the uncertainty in the estimate of the wavelength determined based on the first quad-pair. Equation 3 indicates that the wavelength uncertainty for the first quad-pair is $$\frac{\sqrt{2}}{\pi} \cdot \frac{\text{FSR1}}{\text{DR\_1}},$$

in which FSR1 represents the free spectral range of the first quad-pair. If we choose the free spectral range of the second quad-pair (FSR2) such that FSR2≥FSR1/$DR_1$, then the free spectral range of the second quad-pair should be sufficient to cover the uncertainty in the estimate of the wavelength determined based on measurements of light intensities from the first quad-pair. The formula above indicates that the optical path length difference (OPL_diff2) between the reference and test beams of the second quad-pair should be not more than OPL_diff1·$DR_1$, which means that OPL_diff2 should be not more than 2.88 mm (which is 120·24 µm). For example, we can choose the optical path length difference (OPL_diff2) between the reference and test beams of the second quad-pair to be 2.88 mm, which corresponds to a gap length G=1.44 mm.

The last quad-pair is designed to have a free spectral range that covers the uncertainty in the estimate of the wavelength determined based on the second quad-pair. Equation 3 indicates that the wavelength uncertainty for the second quad-pair is $$\frac{\sqrt{2}}{\pi} \cdot \frac{\text{FSR2}}{\text{DR\_2}}.$$

If we choose the free spectral range of the third quad-pair (FSR3) such that FSR3≥FSR2/$DR_2$, then the free spectral range of the third quad-pair should be sufficient to cover the uncertainty in the estimate of the wavelength determined based on measurements of light intensities from the second quad-pair. The formula above indicates that the optical path length difference (OPL_diff3) between the reference and test beams of the third quad-pair should be not more than OPL_diff2·$DR_2$, which means that OPL_diff3 should be not more than 345.6 mm (which is $120^2$·24 µm). For example, we can choose the optical path length difference (OPL_diff3) between the reference and test beams of the third quad-pair to be 345.6 mm, which corresponds to a gap length G=172.8 mm.

In this example, the optical path difference between the reference and test beams of the intermediate quad-pair can be about 120 times that of the first quad pair, and the optical path difference between the reference and test beams of the last quad-pair can be about 120 times that of the intermediate quad-pair.

This wavemeter design can accommodate root-mean-square intensity signal dynamic ranges as low as, e.g., 100:1. In Equation 3, $$\frac{\sqrt{2}}{\pi} = 0.45,$$

so even if the dynamic range is lowered to 100:1 (instead of 120:1 as anticipated when designing the three quad-pairs), the free spectral range of the second quad-pair can still cover the uncertainty in the wavelength estimate determined based on measurements of interfering light intensities from the first quad-pair, and the free spectral range of the third quad-pair can still cover the uncertainty in the wavelength estimate determined based on measurements of interfering light intensities from the second quad-pair.

The design principles described above can be applied to wavemeters that have a single quad-pair, two cascaded quad-pairs, or more than three cascaded quad-pairs. When there are several cascaded stages of quad-pairs, if the free spectral range of the quad-pair of a later stage is not sufficiently large to cover the uncertainty range of the wavelength estimate produced from the quad-pair in the previous stage, the wavelength estimate determined based the quad-pair in the later stage may produce errors, in which the estimated wavelength is the actual wavelength plus or minus one or multiples of the free spectral range of the quad-pair in the later stage.

The wavelengths of light directed into the cavity 400 are calculated using a model analysis. For a cavity composed of two dielectric surfaces, the interference intensity is theoretically described by the Airy equation:

$$I(v, G) = A \left| \frac{\sqrt{\rho_1} - \sqrt{\rho_2}\, e^{i4\pi v G/c}}{1 - \sqrt{\rho_1 \rho_2}\, e^{i4\pi v G/c}} \right|^2 \quad \text{(Equ. 4)}$$

in which $\rho_1$ is the intensity reflectivity of the fiber end 402 and $\rho_2$ is the effective intensity reflectivity of the test surface (e.g., 404), v is the optical frequency, G the cavity gap, and A is a constant related to the gain when converting the optical signal to a digital signal. A convenient Fourier expansion is $$I(v, G) = A \left[ 1 - \beta(\rho_1, \rho_2) \sum_{k=1}^{K} \gamma(\rho_1, \rho_2)^k \cos(4\pi k v G/c) \right] \quad \text{(Equ. 5)}$$

-continued $$\text{with } \beta(\rho_1, \rho_2) = \frac{2(\rho_1 - 1)(\rho_2 - 1)}{\rho_1 + \rho_2 - 2\rho_1\rho_2}, \gamma(\rho_1, \rho_2) = \sqrt{\rho_1\rho_2}$$

Typically, an expansion to $K \leq 3$ is sufficient for low finesse cavities.

Equation 5 highlights one type of error that can occur when applying simple "cosine equivalent" estimates to a Lissajous analysis on a low Finesse quad-pair to estimate the wavelength. The higher order (k>1) terms are not accounted for. To account for these terms and improve the wavelength determination a more sophisticated approach is to fit the measured cavity intensities to the mathematical model described by Equation 5.

Assuming appropriate values for $\rho_1$, $\rho_2$, and A are available, the only unknown parameter left in Equation 5 is the optical frequency, which is solved at every sample point by nonlinear regression of the measured intensities from the set of cavities to Equation 5. Following Gauss-Newton methods, the parameter update $\delta v$ for a cavity pair at any sample point is evaluated with $$\delta v = [J^T W J]^{-1} J^T W [D-I] \qquad \text{(Equ. 6)}$$

in which W is a 2×2 diagonal weighting matrix, D is a 2×1 vector of measured intensities for the 2 cavities at that sample point, I is the 2×1 vector of theoretical intensities, and J is the 2×1 Jacobian of parameter partial derivatives $$\left[\frac{\partial I}{\partial v}\right].$$

The optical frequency is then updated with $v' = v + \delta v$ and the process is iterated until a termination criteria is reached. For this analysis, it may be adequate to treat each sample equally since the cavities are fixed optimally adjusted cavities, in that case the weighting matrix can be replaced with the unity matrix.

Additional description of using measurements of interference signals from interferometer cavities and fitting the measurements to a mathematical model based on known characteristics of the cavities to evaluate the value of the optical frequency of the laser beam can be found at U.S. patent application Ser. No. 15/616,075, filed on Jun. 7, 2017, incorporated herein by reference in its entirety.

When the above analysis is applied to the interference intensities from one cavity pair, the wavelength can be determined unambiguously if the starting guess is within +½ of the free spectral range of that pair (see Equation 2). Thus, with a single pair, the estimate for the initial estimated wavelength needs to be within ±Γ in order to converge to the correct absolute wavelength. If the initial estimate is outside that range, the algorithm will converge to a wavelength with an error equal to an integer number of free spectral ranges.

To determine the minimum number of cavity pairs needed in the cascade given the uncertainty in the "starting estimate" and the desired final wavelength uncertainty, note first that for fixed SDR (root-mean-square dynamic range of the intensity measurements for both cavities in the quad-pair) the ratio, $$DR = \Gamma/U \qquad \text{(Equ. 7)}$$

is a constant value representing the effective measurement dynamic range of a single cavity pair. Assuming different pairs in the cascade have the same dynamic range, the effective dynamic range for N pairs would be $(\Gamma/U)^N$. The uncertainty U is a root-mean-square value, so for robustness, it is good practice to increase U by a value $\eta$ representing the number of standard deviations a measurement can allow before exceeding the Γ of the next cavity pair. A reasonable number to choose is r=6 standard deviations, making the probability of a failure $\sim 2\times 10^{-9}$ assuming the error is normally distributed. Assuming an SDR of 1000:1 (which can be achieved using 10-bit analog-to-digital converters), the effective dynamic range for one cavity pair is 120:1. Given the initial wavelength uncertainty $\Delta\lambda$ and the final wavelength uncertainty $\delta\lambda$, the number of cavity pairs is determined with the following equation:

$$\left(\frac{\Gamma}{\eta U}\right)^N \geq \frac{\Delta\lambda}{\delta\lambda} \rightarrow N \geq \text{ceil}\left[\log\left(\frac{\Delta\lambda}{\delta\lambda}\right)\Big/\log\left(\frac{\Gamma}{\eta U}\right)\right] \qquad \text{(Equ. 8)}$$

The cavity optical path differences are assumed to be stable by design, which may require environmental isolation from temperature and atmospheric influences. The wavelength analysis described above ignores other real world effects. For example, the different cavities will experience different electrical gains and offsets, intensities and wavelength dependent losses (WDL) due to, e.g., cavity misalignments, component imperfections and wavelength dependent losses in the distribution network. However, if environmentally isolated, these influences are stable over time since the network is passive. Calibrations are used to characterize and compensate for how these effects influence the values for $\rho_1$, $\rho_2$ and A (again, assuming G is sufficiently stable).

The following describes a process for calibrating the wavemeter 100. "Dark" counts (electrical offsets plus detector dark (thermal) currents produced in the absence of light) can be determined by measuring channels when no light is present, and the offset value obtained for each channel is subtracted from all subsequent intensity measurements for that channel. All further corrections discussed below utilize offset corrected intensity measurements, which are noted with a caret (^) above the variable.

In some examples, wavelength dependent losses arise from passive components in the light distribution network, such as splitters, circulators, couplers, and detectors. These losses are usually small, about a few percent and can be different for each channel. The calibration process uses a tunable source with accurately known intensity and wavelength to measure the wavelength dependent losses for each cavity channel relative to the intensity monitor channel as a function of wavelength over the full wavelength range. Sweeps sampling the full wavelength range at a high density are acquired by the wavemeter 100 with the second surface 404 of all cavity channels blocked. For example, a piece of non-reflective or light absorbing material can be inserted in the cavity 400 between the first surface 402 and the second surface 404. The calibration sweeps can be performed at a low speed or at stepped wavelength positions, with averaging at each point to reduce measurement error. One can write $$\varepsilon_j(v)\langle \hat{C}_j(v)\rangle / \langle \hat{I}(v)\rangle$$

$$\varepsilon_m(v)\langle \hat{M}(v)\rangle / \langle \hat{I}(v)\rangle \qquad \text{(Equ. 9)}$$

in which $I(v)$ is the source intensity at the optical frequency v, $\hat{C}_j(v)$ is the measured offset corrected detector signal for cavity channel j, $\hat{M}(v)$ the offset corrected intensity monitor signal, $\varepsilon_j(v)$ represents the wavelength dependent losses for that channel, $\varepsilon_m(v)$ represents the wavelength dependent losses observed in the intensity monitor, and $\langle\ \rangle$ represents an average of multiple measurements. Since the wavelength dependent losses are independent of laser intensity, it can be advantageous to normalize the wavelength dependent losses by dividing by the wavelength dependent losses at a particular selected wavelength ν':

$$\tilde{\varepsilon}_j(\nu) = \varepsilon_j(\nu)/\varepsilon_j(\nu')$$

$$\tilde{\varepsilon}_m(\nu) = \varepsilon_m(\nu)/\varepsilon_m(\nu') \quad \text{(Equ. 10)}$$

For determining the remaining variables $\rho_1$, $\rho_2$, and A, data from another sweep is taken but with the second surface 404 of the cavity 400 unblocked. Each channel is offset corrected and divided by the corresponding $\tilde{\varepsilon}_j(\nu)$ to correct for wavelength dependent losses.

$$D_j(\nu) = \langle \hat{C}_j(\nu)/\tilde{\varepsilon}_j(\nu) \rangle$$

$$IM(\nu) = \langle \hat{M}(\nu)/\tilde{\varepsilon}_m(\nu) \rangle \quad \text{(Equ. 11)}$$

Once again the sweep can be at low speed or at stepped wavelength positions, with averaging at each point to reduce measurement error. This data set determines the wavelength independent values for $\rho_1$, $\rho_2$, and A by fitting the data from each cavity to Equation 5 using Equation 6 and the known values of ν and G. W is a N×N diagonal weighting matrix, D is a N×1 vector of measured offset and WDL corrected intensities at all N sample points, I is the N×1 vector of theoretical intensities and J is a N×3 Jacobian of parameter partial derivatives $$\left[ \frac{\partial I}{\partial \rho_1}, \frac{\partial I}{\partial \rho_2}, \frac{\partial I}{\partial A} \right].$$

Good initial estimates for these three unknowns are obtained from first principles (for $\rho_1$ and $\rho_2$) and from the data itself (for A), so the regression converges quickly and reliably. In some cases, for example, when using a cavity design similar to that shown in FIG. 6, it may only be necessary to refine $\rho_2$ and A since $\rho_2$ can be different from a pure theoretical value due to its sensitivity to cavity alignment.

A is independent of wavelength, but scales with intensity. To account for this dependence, the value determined by the regression is normalized by the averaged value of the intensity monitor $\langle IM(\nu) \rangle$:

$$\hat{A} = A/\langle IM \rangle \quad \text{(Equ. 12)}$$

so in subsequent wavelength measurements the value of A used at each sample in Equation 12 is determined with the following:

$$A(\nu) = \hat{A}\hat{M}(\nu)/\tilde{\varepsilon}_m(\nu) \quad \text{(Equ. 13)}$$

Figure 8:
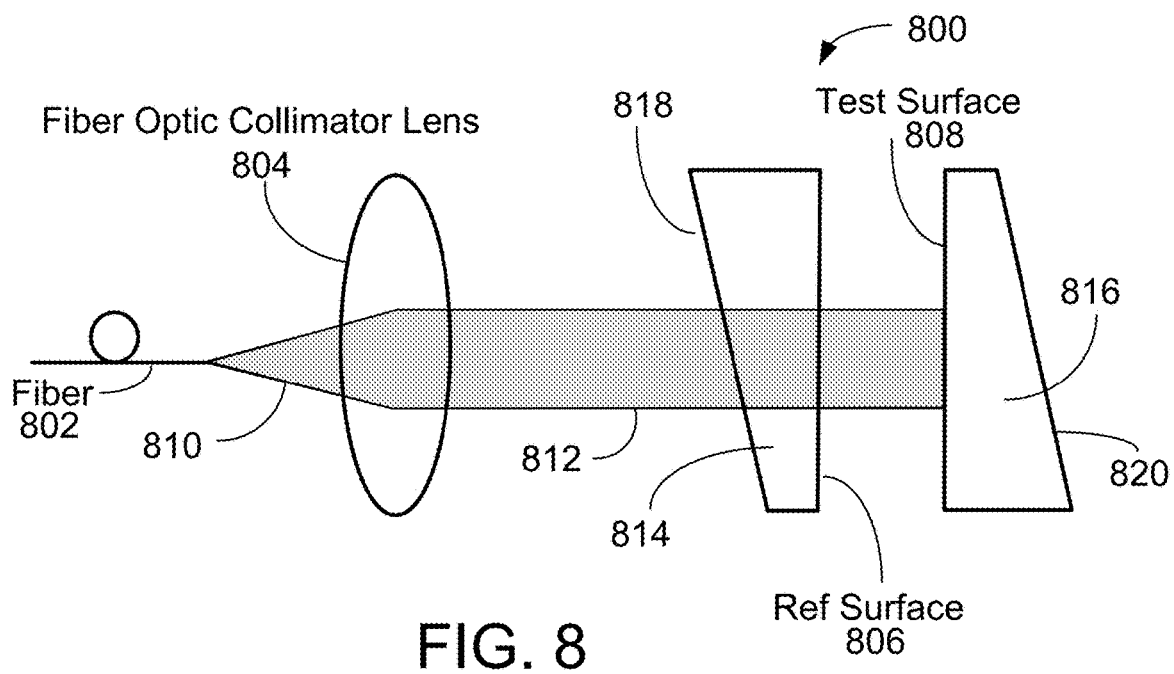
FIGS. 8-11 are diagrams of examples of interferometer cavity designs that can be used for the wavemeter.

The following describes several examples of interferometer cavity designs that can be used in combination with, or replace, the interferometer cavities 120 of FIGS. 6 and 7. Referring to FIG. 8, an interferometer cavity unit 800 includes a fiber optic collimator and two surfaces using wedges. Laser light 810 transmitted through an optical fiber 802 is collimated by a fiber optic collimator lens 804 to produce collimated light 812 that is directed towards a first optical wedge 814 having a surface 818 and a reference surface 806. A portion of the light 812 passes the reference surface 806 and is directed towards a second optical wedge 816 having a test surface 808 and a surface 820. The reference surface 806 and the test surface 808 are plane surfaces that are orthogonal to the beam path, and the space between the reference surface 806 and the test surface 808 forms an interferometer cavity. The distance between the reference surface 806 and the test surface 808 corresponds to the cavity gap length G in Equation 1. The light beams reflected from the reference surface 806 and the test surface 808 are directed back toward the collimator lens 804, which directs the reflected interfering light beams back into the fiber 802. The surfaces 818 and 820 are not orthogonal to the beam path of the light 812, so light reflected from the surfaces 818 and 820 are not directed back into the fiber 802. Using optical wedges eliminates reflections from those unwanted surfaces.

Figure 9:
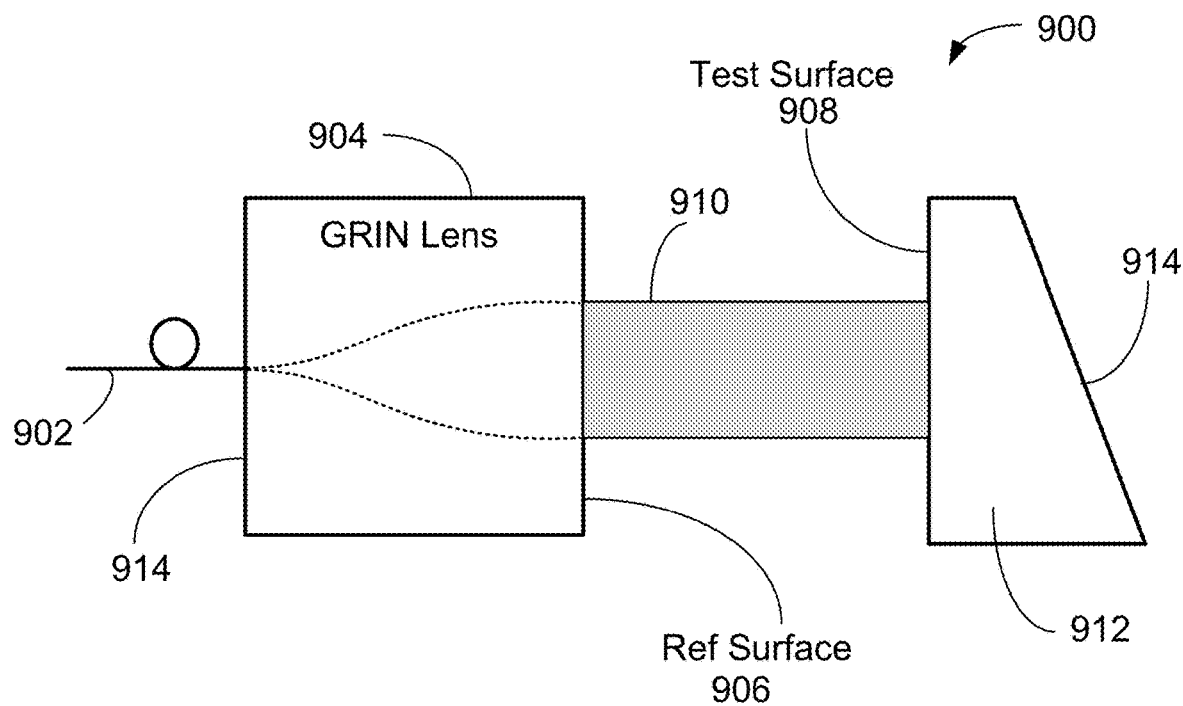

Referring to FIG. 9, an interferometer cavity unit 900 includes a gradient-index (GRIN) lens 904 and an optical wedge 912. The exit surface of the gradient-index lens 904 functions as a cavity reference surface 906. The gradient-index lens 904 receives laser light transmitted through an optical fiber 902 at a first surface 914 and generates a collimated beam 910. A portion of the collimated beam 910 passes the reference surface 906 and is directed towards the wedge 912. The wedge 912 has a test surface 908 and a surface 914. The reference surface 906 and the test surface 908 are plane surfaces that are orthogonal to the beam path of the collimated beam 910, and the space between the reference surface 906 and the test surface 908 forms an interferometer cavity. The distance between the reference surface 906 and the test surface 908 corresponds to the cavity gap length G in Equation 1. Light reflected from the reference surface 906 and the test surface 908 are directed by the gradient-index lens 904 back into the optical fiber 902, forming interfering light. The surface 914 is not orthogonal to the beam path of the collimated beam 910, and light reflected from the surface 914 is not directed back to the fiber 902.

Figure 10:
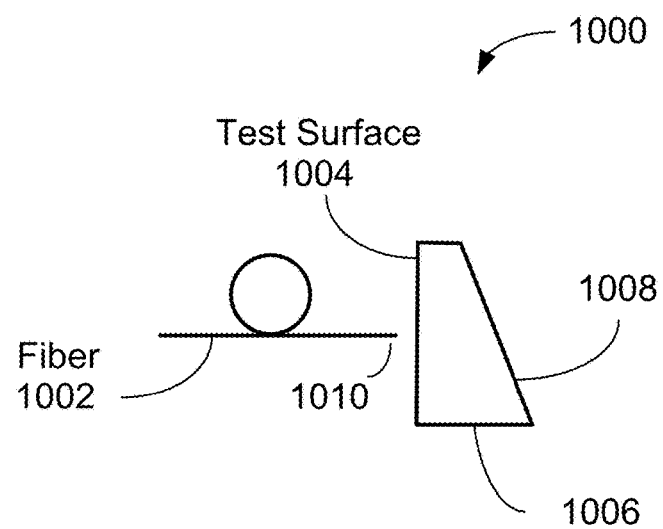

Referring to FIG. 10, an interferometer cavity is produced by the end face of a flat-polished fiber and an optical wedge. This design is useful for, e.g., a cavity having a large free spectral range. An interferometer cavity unit 1000 includes an optical wedge 1006 that is spaced apart from an end face 1010 of a flat-polished fiber 1002. Laser light is transmitted through the fiber 1002, in which a portion of the laser light is reflected by the end face 1010. The end face 1010 functions as a reference surface. A portion of the laser light exits the end face 1010 and is directed towards the wedge 1006. The wedge 1006 includes a test surface 1004 that is a plane surface substantially orthogonal to the beam path of the laser light and reflects a portion of the light back towards the end face 1010 of the fiber 1002. The space between the fiber end face 1010 and the test surface 1004 forms an interferometer cavity. The distance between the end face 1010 and the test surface 1004 corresponds to the cavity gap length G in Equation 1. The wedge 1006 has a surface 1008 that is not orthogonal to the beam path of the laser light, and the light reflected from the surface 1008 is not directed back to the fiber 1002.

Figure 11:
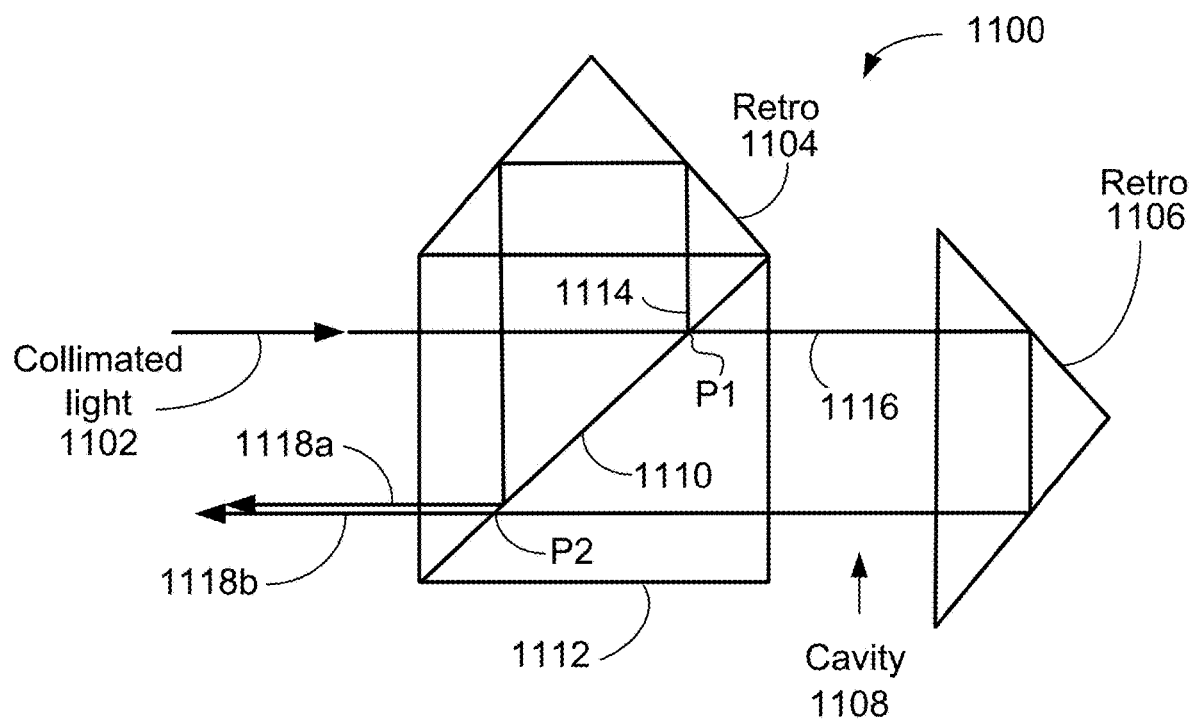

Referring to FIG. 11, an interferometer cavity can be formed using a free-space laser beam and various optical elements having reflective or semi-reflective surfaces. An interferometer cavity unit 1100 includes a beam splitter 1112, a first retro-reflector 1104, and a second retro-reflector 1106. The beam splitter 1112 includes a beam splitting surface 1110. A collimated laser beam 1102 is directed towards the beam splitter 1112, and the beam splitting surface 1110 splits the light beam 1102 into a reference beam 1114 and a test beam 1116 at a position P1. The reference beam 1114 is retroreflected by the first retro-reflector 1104, directed back towards the beam splitter 1112, and reflected by the beam splitting surface 1110 to form an output beam 1118a. The test beam 1116 is retroreflected by the second retro-reflector 1106, directed back towards the beam splitter 1112, and passes the beam splitting surface 1110 to form an output beam 1118b. The output beams 1118a and 1118b overlap at a point P2 on the beam splitting surface 1110 and form interfering beams that are directed toward the detection unit.

In this design, the difference between the path length of the reference beam 1114 from P1 to P2 and the path length of the test beam 1116 from P1 to P2 corresponds to two times the cavity gap length, 2G of Equation 1. The path length of the reference beam 1114 within the beam splitter 1112 and the path length of the test beam 1116 within the beam splitter 1112 are the same. If the first retro-reflector 1104 and the second retro-reflector 1106 have the same size, then the path length of the reference beam 1114 within the first retro-reflector 1104 and the path length of the test beam 1116 within the second retro-reflector 1106 are the same. Thus, the path length difference between the reference beam 1114 and the test beam 1116 is twice the gap length of a cavity 1108 formed between the beam splitter 1112 and the second retro-reflector 1106. The distance between the beam splitter 1112 and the second retro-reflector 1106 corresponds to the cavity gap length G in Equation 1. The free spectral range of the interferometer cavity unit 1100 can be modified by adjusting the distance between the beam splitter 1112 and the second retro-reflector 1106. An advantage of this design is that it can have fewer alignment issues compared to other designs that use laser light provided by optical fibers. The interferometer cavity unit 1100 is designed to limit reflections from various intermediate surfaces.

Figure 12A:
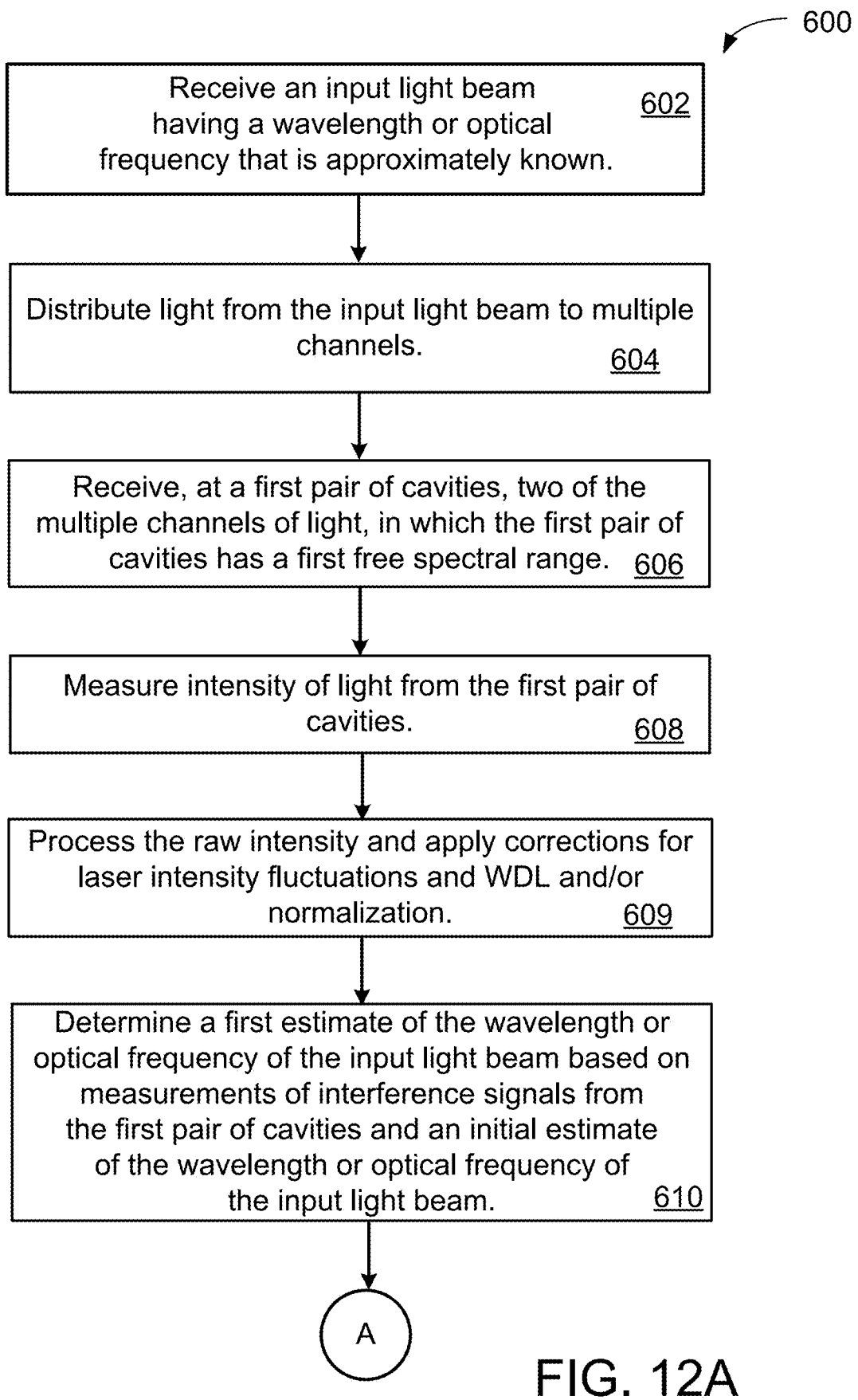
FIGS. 12A and 12B show a flow diagram of an example process for determining a wavelength of a light beam.
Figure 12B:
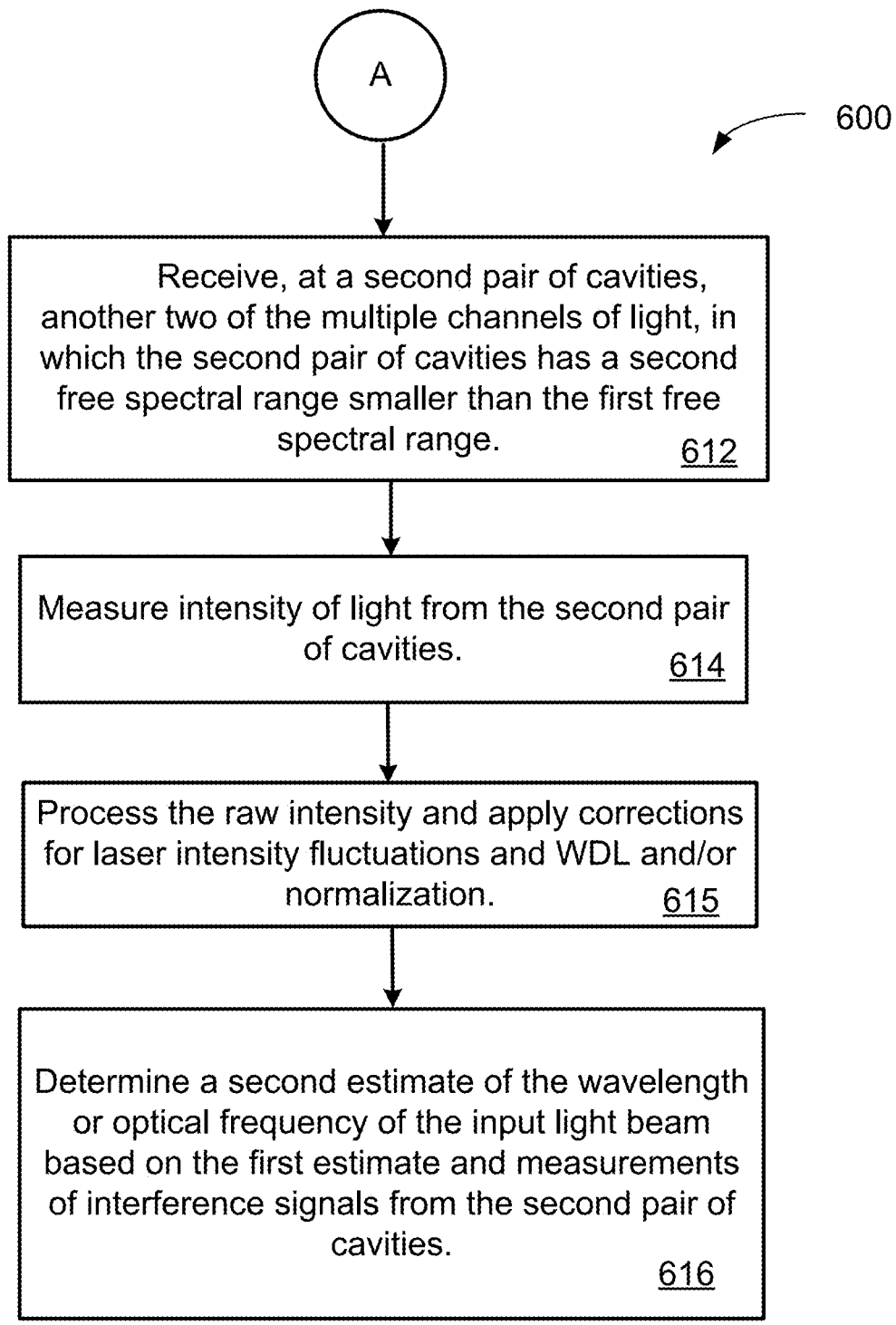

Referring to FIGS. 12A and 12B, a process 600 for determining the wavelength of a light beam is provided. The process 600 includes receiving 602 an input light beam having a wavelength or optical frequency that is approximately known. For example, the input light beam can be the light beam 118 provided by the light source 124. An initial estimate of the wavelength or optical frequency can be specified by a manufacturer of the light source 124. The process 600 includes distributing 604 light from the input light beam to multiple channels. For example, the optical distributor 102 can distribute the light from the input light beam 118 to multiple channels 104.

The process 600 includes receiving 606, at a first pair of cavities, two of the multiple channels of light, in which the first pair of cavities has a first free spectral range. For example, the first pair 122a of cavities 120a and 120b can receive two of the channels of light from the splitter/circulator module 106. The process 600 includes measuring 608 the intensity of light from the first pair of cavities. For example, the detectors 126 in the detection module 110 can measure the intensity of light from the first pair 122a of cavities 120a and 120b. The process 600 includes processing 609 the raw intensity measured in step 608 and applying corrections for laser intensity fluctuations and WDL and/or normalization.

The process 600 includes determining 610 a first estimate of the wavelength or optical frequency of the input light beam based on measurements of interference signals from the first pair of cavities and an initial estimate of the wavelength or optical frequency of the input light beam. For example, the data processor 114 can determine a first estimate of the wavelength or optical frequency of the input light beam 118 based on measurements of interference signals from the first pair 122 of cavities 120 and an initial estimate of the wavelength or optical frequency of the input light beam specified by the manufacturer of the light source 124. For example, the first estimate can have an uncertainty that is smaller than the first free spectral range.

The process 600 includes receiving 612, at a second pair of cavities, another two of the multiple channels of light, in which the second pair of cavities has a second free spectral range smaller than the first free spectral range. For example, the second pair 122b of cavities 120c and 120d can receive two of the channels of light from the splitter/circulator module 106. The process 600 includes measuring 614 the intensity of light from the second pair of cavities. For example, the detectors 126 in the detection module 110 can measure the intensity of light from the second pair 122b of cavities 120c and 120d. The process 600 includes processing 615 the raw intensity measured in step 614 and applying corrections for laser intensity fluctuations and WDL and/or normalization.

The process 600 includes determining 616 a second estimate of the wavelength or optical frequency of the input light beam based on the first estimate and measurements of interference signals from the second pair of cavities. For example, the data processor 114 can determine a second estimate of the wavelength or optical frequency of the input light beam based on the first estimate and measurements of interference signals from the second pair of cavities. For example, the second estimate of the wavelength or optical frequency of the input light beam can have an uncertainty less than the second free spectral range.

In some implementations, the features described above related to processing of data, e.g., determining the optical frequency values by nonlinear regression using the Gauss Newton methods, can be implemented by the processor 114, which can include one or more of digital electronic circuitry, computer hardware, firmware, and software. For example, some of the features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

The described features related to processing of data can be implemented advantageously in one or more computer programs that are executable on a programmable system including at least one programmable processor coupled to receive data and instructions from, and to transmit data and instructions to, a data storage system, an input device, and an output device. A computer program is a set of instructions that can be used, directly or indirectly, in a computer to perform a certain activity or bring about a certain result. A computer program can be written in any form of programming language (e.g., Fortran, C, C++, C#, Objective-C, Java, Python), including script, compiled, or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, flash memory devices, and 3D XPoint™ memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a liquid crystal display (LCD) or an organic light emitting diode (OLED) monitor for displaying information to the user and a keyboard and a pointing device such as a mouse or a trackball, or a touch or voice interface by which the user can provide input to the computer.

Although some implementations have been described above, other embodiments are also within the scope of the following claims. For example, the cavity design can be different from those shown in FIGS. 6 to 11. A wavemeter can have multiple types of cavities. The coupling of light from the splitter/circulator module 106 to the cavities 102 does not have to use optical fibers. For example, free space optics can be used such that light propagates through air from the splitter/circulator module 106 to and from the cavities 102.

For example, the splitters/circulators module 106 can include a combination of optical splitters and optical circulators. Because the optical splitters throw away half of the input light, the intensity of the reflected interfering light output from the optical splitter toward the detector is approximately half of the reflected interfering light output from the optical circulator toward the detector. A normalization procedure is used to normalize the intensity of light from the optical splitters and the light from the optical circulators. For example, the optical splitters/circulator module 106 and the interferometer cavities can be implemented as double-pass interferometers such that the light travels the cavity gap four times (i.e., two round-trips between the modules 106 and 108) before being directed toward the detection module 110.

For example, the interferometer cavity module 108 can include a plurality of sets of cavities, in which different sets of cavities have different numbers of cavities. For example, some sets of cavities can have two cavities in each set, in which the two cavities have approximately the same free spectral range, and the two cavities are in approximate quadrature at a specified wavelength. Some sets of cavities can have three cavities in each set, in which the three cavities have approximately the same free spectral range, and at least two of the three cavities are in approximate quadrature at a specified wavelength. Some sets of cavities can have four cavities in each set, in which the four cavities have approximately the same free spectral range, and at least two of the four cavities are in approximate quadrature at a specified wavelength, and so forth.

Figure 13:
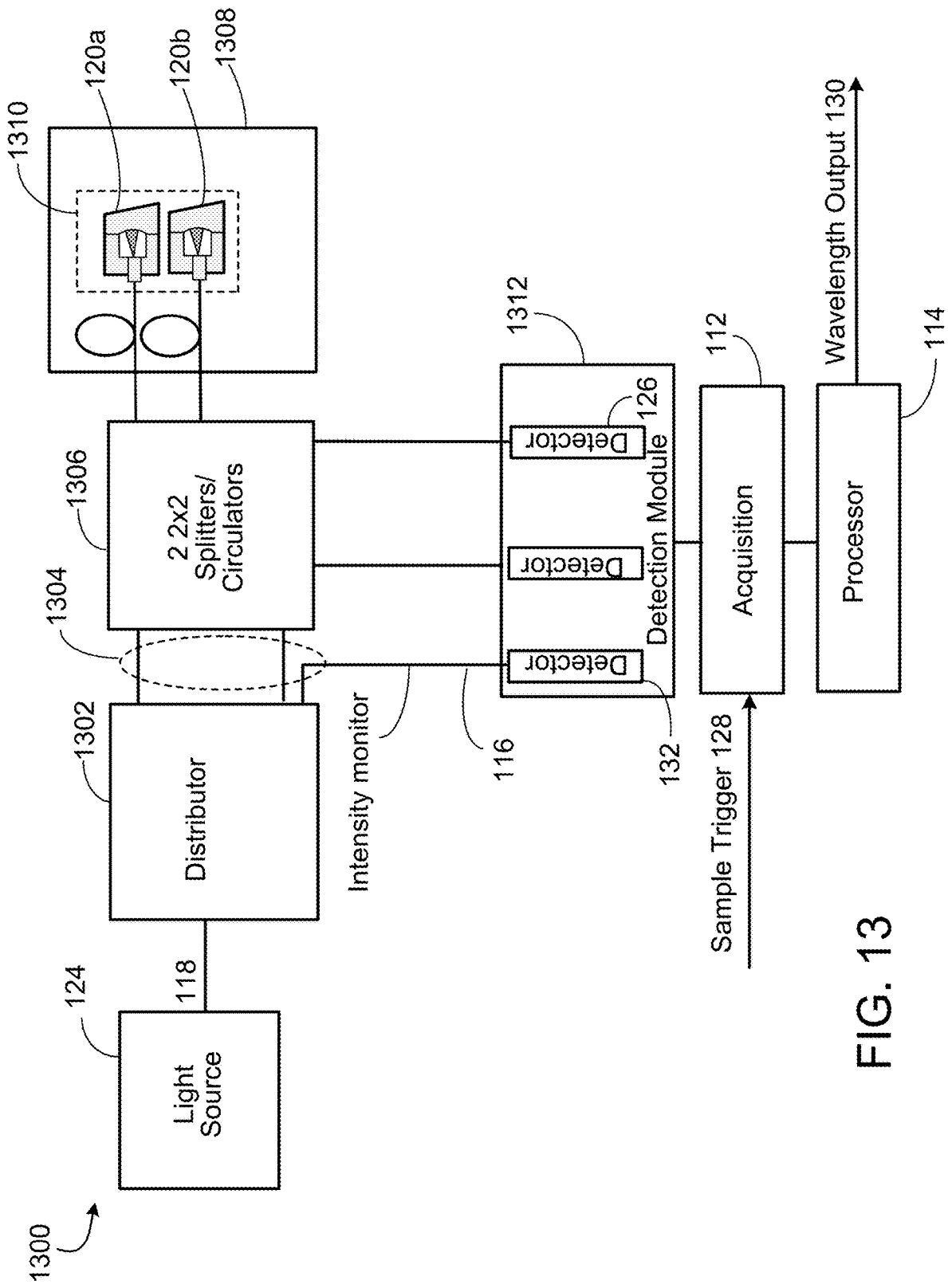
FIG. 13 is a block diagram of an example wavemeter system architecture having a set of interferometer cavities.

Referring to FIG. 13, in some implementations, a wavemeter can have a single set of cavities, in which the set includes two or more cavities having similar cavity gap lengths. A wavemeter 1300 includes an optical distributor 1302 that receives an input light beam 118 provided by a light source 124. The optical distributor 1302 splits and directs laser light into multiple channels 1304. A splitter/circulator module 1306 directs light in some of the channels 1304 to an interferometer cavity module 1308 that includes a set 1310 of interferometer cavities, e.g., 120a and 120b. In the example of FIG. 13, the set 1308 includes two interferometer cavities 120a and 120b. However, in other examples, the set 1308 can also include three or more interferometer cavities. In those examples, the distributor 1302 provides additional channels of light to the splitters/circulators 1306, which provides the additional channels of light to the additional cavities.

The light in each channel is directed toward a cavity 120, and interfering light is reflected by the cavity 120 back towards the splitter/circulator module 1306. The splitter/circulator module 1306 captures the reflected interfering light from the set 1310 of cavities and directs the interfering reflected light to a detection module 1312 that includes a plurality of detectors 126. Each detector 126 detects the intensity of light from one channel of light. An acquisition module 112 samples the light intensity from the channels of light provided by the detection module 1312 at a high frequency rate, in which the sampling of data is triggered by a sample trigger signal 128. A data processor 114 processes the data from the acquisition module 112 to determine the wavelength of the light at a high speed, and generates a wavelength output 130. In some implementations, at least one channel of the laser light (e.g., 116) is used for monitoring the intensity of the laser light 118 to account for intensity variations of the light source 124.

The wavemeter 1300 of FIG. 13 operates in a manner similar to the wavemeter 100 of FIG. 1, except that there is a single set 1310 of interferometer cavities. The set 1310 includes a pair of interferometer cavities 120 that have approximately the same free spectral range, and the pair of interferometer cavities are in approximate quadrature near the center wavelength of the light source 124. It is also possible to configure the set 1310 to include three or more interferometer cavities 120 that have approximately the same free spectral range, and at least one pair of interferometer cavities 120 are in approximate quadrature near the center wavelength.

The invention claimed is:
1. A method comprising:
receiving an input light beam;
distributing light from the input light beam to multiple channels;
receiving, at a first pair of interferometer cavities, two of the multiple channels of light, in which the first pair of cavities has a first free spectral range;
measuring intensity of light reflected from the first pair of cavities;
determining a first estimate of the wavelength or optical frequency of the input light beam based on measurements of interference signals from the first pair of cavities and an initial estimate of the wavelength or optical frequency of the input light beam;
receiving, at a second pair of cavities, another two of the multiple channels of light, in which the second pair of cavities has a second free spectral range smaller than the first free spectral range;
measuring intensity of light from the second pair of cavities; and
determining a second estimate of the wavelength or optical frequency of the input light beam based on the first estimate and measurements of interference signals from the second pair of cavities, in which the second estimate is more accurate than the first estimate.

2. The method of claim 1 in which the intensity of light reflected from the first pair of cavities and the intensity of light from the second pair of cavities are measured concurrently.

3. The method of claim 1 in which the first pair of cavities are in approximate quadrature.

4. The method of claim 3 in which the input light beam has a wavelength that is approximately known to be within a range between a first wavelength $\lambda 1$ and a second wavelength $\lambda 2$, the first pair of cavities comprises a first interferometer cavity and a second interferometer cavity, the first interferometer cavity has a first cavity gap length g1, the second interferometer cavity has a second cavity gap length g2, an absolute difference $|g1-g2|$ between the first cavity gap length and the second cavity gap length is approximately $m1 \cdot \lambda_0/8$, $\lambda_0 = (\lambda 1 + \lambda 2)/2$, m1 is an odd integer, and $$0.8 \cdot m1 \cdot \lambda_0/8 < |g1-g2| < 1.2 \cdot m1 \cdot \lambda_0/8.$$

5. The method of claim 4 in which the second pair of cavities are in approximate quadrature.

6. The method of claim 5 in which the second pair of cavities comprises a third interferometer cavity and a fourth interferometer cavity, the third interferometer cavity has a third cavity gap length g3, the fourth interferometer cavity has a fourth cavity gap length g4, an absolute difference $|g3-g4|$ between the third cavity gap length and the fourth cavity gap length is approximately $m2 \cdot \lambda_0/8$, m2 is an odd integer, and $$0.8 \cdot m2 \cdot \lambda_0/8 < |g3-g4| < 1.2 \cdot m2 \cdot \lambda_0/8.$$

7. The method of claim 6 in which the mean cavity gap length of the first pair of interferometer cavities is smaller than the mean cavity gap length of the second pair of interferometer cavities, $(g1+g2)<(g3+g4)$.

8. The method of claim 4 in which $0.9 \cdot m1 \cdot \lambda_0/8 < |g1-g2| < 1.1 \cdot m1 \cdot \lambda_0/8$.

9. The method of claim 1 in which determining the first estimate of the wavelength or optical frequency of the input light beam includes fitting the measurements of the interference signals of the first pair of cavities to a mathematical model based on known characteristics of the first pair of cavities.

10. The method of claim 9 in which fitting the measurements of the interference signals of the first pair of cavities comprises using regression analysis of the interference signals to fit the mathematical model to determine the first estimate of the wavelength or optical frequency of the input light beam.

11. The method of claim 1, comprising:
sampling the light intensity measurements, and
analyzing the samples of the light intensity measurements to determine the first and second estimates of the wavelength or optical frequency of the input light beam.

12. The method of claim 11, comprising:
generating the light beam using a swept wavelength tunable laser;
sweeping the wavelength of the light beam from a first wavelength to a second wavelength at a frequency of at least P1 sweeps per second with at least P2 points per sweep, and P1·P2 is at least 100;

sampling the light intensity measurements synchronously with the sweeping operation of the swept wavelength tunable laser, in which at least 100 samplings are performed per second; and
determining the first and second estimates of the wavelength or optical frequency synchronously with the sweeping operation of the swept wavelength tunable laser, in which at least 100 first and second estimates are determined per second.

13. The method of claim 11, comprising:
generating the light beam using a swept wavelength tunable laser;
sweeping the wavelength of the light beam from a first wavelength to a second wavelength at a frequency of at least P1 sweeps per second with at least P2 points per sweep, and P1·P2 is at least $10^8$;
sampling the light intensity measurements synchronously with the sweeping operation of the swept wavelength tunable laser, in which at least $10^8$ samplings are performed per second; and
determining the first and second estimates of the wavelength or optical frequency synchronously with the sweeping operation of the swept wavelength tunable laser, in which at least $10^8$ first and second estimates are determined per second.

14. The method of claim 13, comprising performing optical coherence tomography using the at least $10^8$ second estimates per second of the wavelengths or optical frequencies of the light beam.

15. The method of claim 1, comprising performing optical coherence tomography using the second estimate of the wavelength or optical frequency of the light beam.

16. The method of claim 1, comprising determining wavelength dependent losses associated with the channels, and compensating for the wavelength dependent losses when determining the first and second estimates of the wavelength or optical frequency of the input light beam.

17. The method of claim 1, comprising:
receiving, at a third pair of cavities, another two of the multiple channels of light;
measuring intensity of light from the third pair of cavities;
determining a third estimate of the wavelength or optical frequency of the input light beam based on the second estimate and measurements of interference signals from the third pair of cavities.

18. The method of claim 17 in which the intensity of light reflected from the first, second, and third pairs of cavities are measured concurrently.

19. The method of claim 17 in which the first pair of cavities are in approximate quadrature,
the second pair of cavities are in approximate quadrature,
the third pair of cavities are in approximate quadrature,
the input light beam has a wavelength that is approximately known to be within a range between a first wavelength $\lambda 1$ and a second wavelength $\lambda 2$,
the first pair of cavities comprises a first interferometer cavity and a second interferometer cavity, the first interferometer cavity has a first cavity gap length g1, the second interferometer cavity has a second cavity gap length g2,
an absolute difference $|g1-g2|$ between the first cavity gap length and the second cavity gap length is approximately $m1 \cdot x_0/8$, $\lambda_0 = (\lambda 1 + \lambda 2)/2$, m1 is an odd integer, $$0.8 \cdot m1 \cdot \lambda_0/8 < |g1-g2| < 1.2 \cdot m1 \cdot \lambda_0/8;$$

the second pair of cavities comprises a third interferometer cavity and a fourth interferometer cavity, the third interferometer cavity has a third cavity gap length g3, the fourth interferometer cavity has a fourth cavity gap length g4, an absolute difference |g3−g4| between the third cavity gap length and the fourth cavity gap length is approximately $m2 \cdot \lambda_0/8$, m2 is an odd integer, $$0.8 \cdot m2 \cdot \lambda_0/8 < |g3-g4| < 1.2 \cdot m2 \cdot \lambda_0/8,$$

the third pair of cavities comprises a fifth interferometer cavity and a sixth interferometer cavity, the fifth interferometer cavity has a fifth cavity gap length g5, the sixth interferometer cavity has a sixth cavity gap length g6, an absolute difference |g5−g6| between the fifth cavity gap length and the sixth cavity gap length is approximately $m3 \cdot \lambda_0/8$, m3 is an odd integer, and $$0.8 \cdot m3 \cdot \lambda_0/8 < |g5-g6| < 1.2 \cdot m3 \cdot \lambda_0/8.$$

20. The method of claim 19 in which the mean cavity gap length of the first pair of interferometer cavities is smaller than the mean cavity gap length of the second pair of interferometer cavities, and the mean cavity gap length of the second pair of interferometer cavities is smaller than the mean cavity gap length of the third pair of interferometer cavities, (g1+g2)<(g3+g4)<(g5+g6).

21. The method of claim 19 in which $0.9 \cdot m1 \cdot \lambda_0/8 < |g1-g2| < 1.1 \cdot m1 \cdot \lambda_0/8$, $$0.9 \cdot m2 \cdot \lambda_0/8 < |g3-g4| < 1.1 \cdot m2 \cdot \lambda_0/8, \text{ and}$$

$$0.9 \cdot m3 \cdot \lambda_0/8 < |g5-g6| < 1.1 \cdot m3 \cdot \lambda_0/8.$$

* * * * *

UNITED STATES PATENT AND TRADEMARK OFFICE
CERTIFICATE OF CORRECTION

PATENT NO. : 10,845,251 B2  
APPLICATION NO. : 16/449770  
DATED : November 24, 2020  
INVENTOR(S) : Leslie L. Deck Page 1 of 1

It is certified that error appears in the above-identified patent and that said Letters Patent is hereby corrected as shown below:

On the Title Page

Column 2  
Item [56], Line 1, delete "Angsrom" and insert -- Angstrom --

In the Specification

Column 1  
Line 8, after "application" insert -- No. --

In the Claims

Column 22  
Line 63, Claim 19, delete "x$_0$" and insert -- $\lambda_0$ --

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*